(12) United States Patent
Kawakatsu et al.

(10) Patent No.: US 7,695,371 B2
(45) Date of Patent: Apr. 13, 2010

(54) CONSTANT VELOCITY JOINT

(75) Inventors: Tsutomu Kawakatsu, Utsunomiya (JP);
Naoto Shibata, Utsunomiya (JP);
Masato Saika, Shioya-gun (JP);
Tomonori Aoyama, Mooka (JP)

(73) Assignee: Honda Motor Co., Ltd., Minato-ku, Tokyo (JP)

( * ) Notice: Subject to any disclaimer, the term of this patent is extended or adjusted under 35 U.S.C. 154(b) by 313 days.

(21) Appl. No.: 11/795,713

(22) PCT Filed: Jan. 19, 2006

(86) PCT No.: PCT/JP2006/300775
§ 371 (c)(1),
(2), (4) Date: Jul. 20, 2007

(87) PCT Pub. No.: WO2006/077947
PCT Pub. Date: Jul. 27, 2006

(65) Prior Publication Data
US 2008/0096676 A1    Apr. 24, 2008

(30) Foreign Application Priority Data
Jan. 20, 2005  (JP) .............................. 2005-012924

(51) Int. Cl.
*F16D 3/205* (2006.01)
(52) U.S. Cl. ...................................... 464/111; 464/905
(58) Field of Classification Search ................. 464/111, 464/123, 124, 905
See application file for complete search history.

(56) References Cited

U.S. PATENT DOCUMENTS

| 1,625,410 | A | * | 4/1927 | de Ram | ....................... 464/905 |
| 4,178,778 | A | * | 12/1979 | Orain | ........................... 464/111 |
| 5,135,438 | A | | 8/1992 | Poulin et al. | |
| 6,033,311 | A | | 3/2000 | Bartlett | |

FOREIGN PATENT DOCUMENTS

| JP | 61-266830 | 11/1986 |
| JP | 63-115927 | 7/1988 |
| JP | 7-91457 | 4/1995 |
| JP | 07-103250 | 4/1995 |
| JP | 11-508673 | 7/1999 |

OTHER PUBLICATIONS

Universal Joint and Driveshaft Design Manual, AE-7, Society of Automotive Engineers, Inc., Warrendale. PA, pp. 137 & 138, TJ1079. S62 1979.*

* cited by examiner

*Primary Examiner*—Greg Binda
(74) *Attorney, Agent, or Firm*—Squire, Sanders & Dempsey L.L.P.

(57) ABSTRACT

A constant velocity joint, where the tilt angle of a first trunnion relative to a plane crossing perpendicularly to the axis of a second shaft is set to be different from the tilt angle of a second trunnion and the tilt angle of a third trunnion. The tilt angle of the second trunnion and the tilt angle of the third trunnion are set to be equal to or different from each other, and three axes of the first to third trunnions are set to be included on a same plane.

3 Claims, 24 Drawing Sheets

FIG. 5 (1ST COMPARATIVE EXAMPLE)

(2ND COMPARATIVE EXAMPLE)

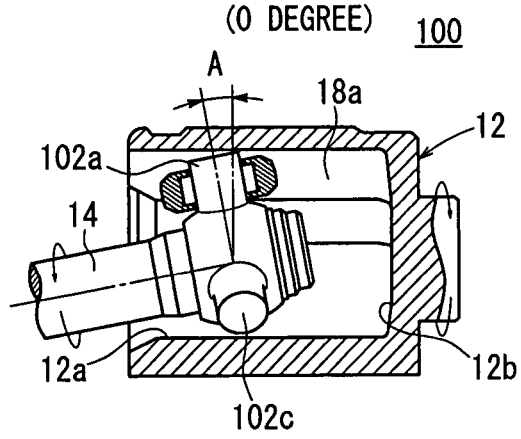
FIG. 7A (0 DEGREE)
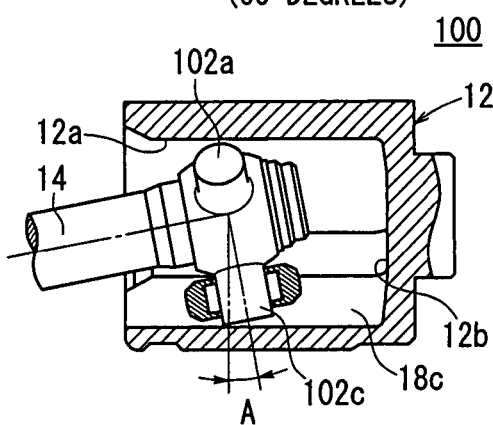
FIG. 7B (60 DEGREES)
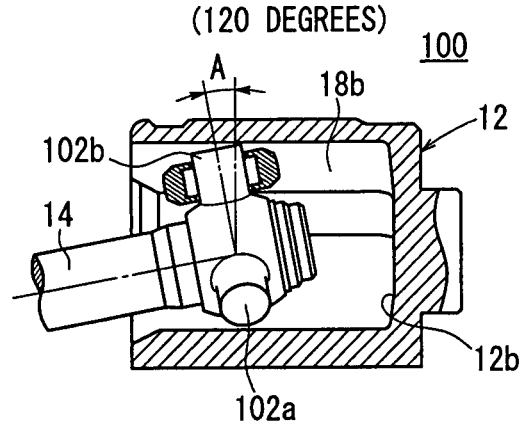
FIG. 7C (120 DEGREES)
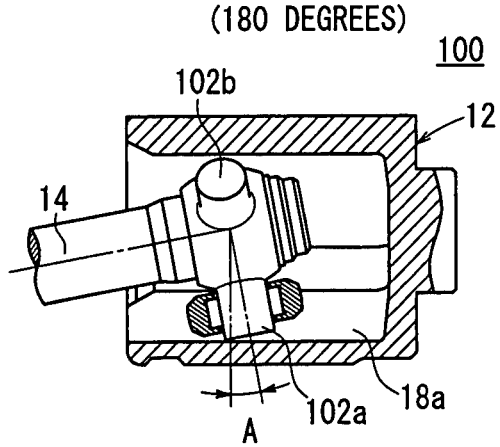
FIG. 7D (180 DEGREES)
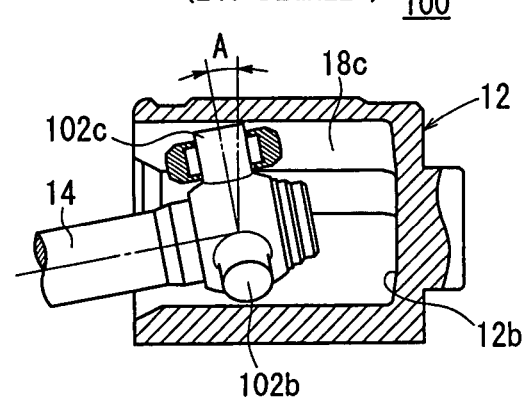
FIG. 7E (240 DEGREES)
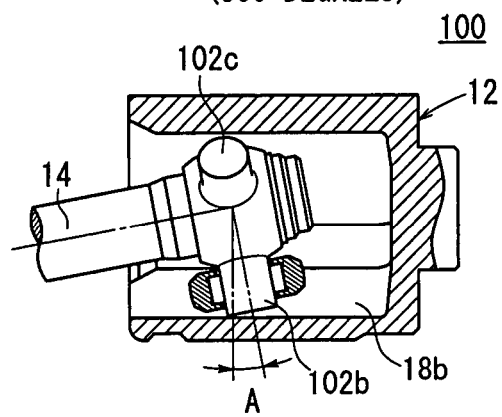
FIG. 7F (300 DEGREES)

(1ST COMPARATIVE EXAMPLE)

(0 DEGREE)

(60 DEGREES)

(120 DEGREES)

(180 DEGREES)

(240 DEGREES)

(300 DEGREES)

(2ND COMPARATIVE EXAMPLE)

(0 DEGREE)

(60 DEGREES)

(120 DEGREES)

(180 DEGREES)

(240 DEGREES)

(300 DEGREES)

(PRESENT EMBODIMENT)

(1ST COMPARATIVE EXAMPLE)

(PRSENNT EMBODIMENT)

(1ST COMPARATIVE EXAMPLE)

(PRESENT EMBODIMENT)

(1ST COMPARATIVE EXAMPLE)

(PRESENT EMBODIMENT)

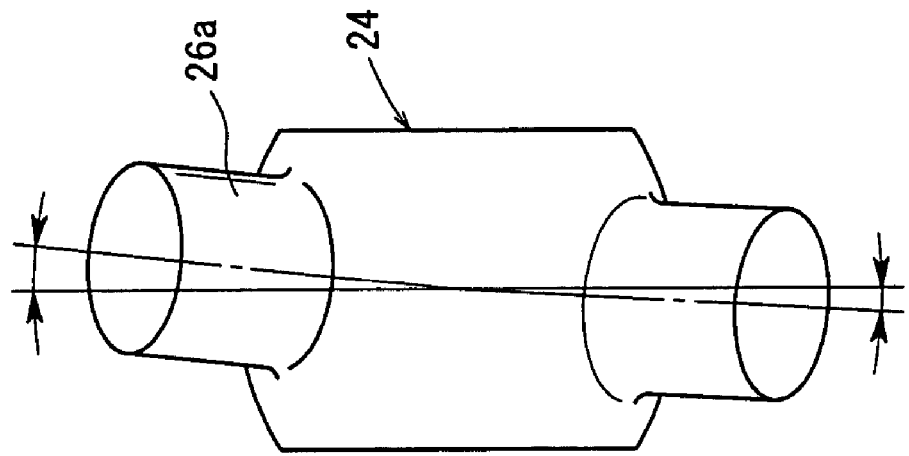
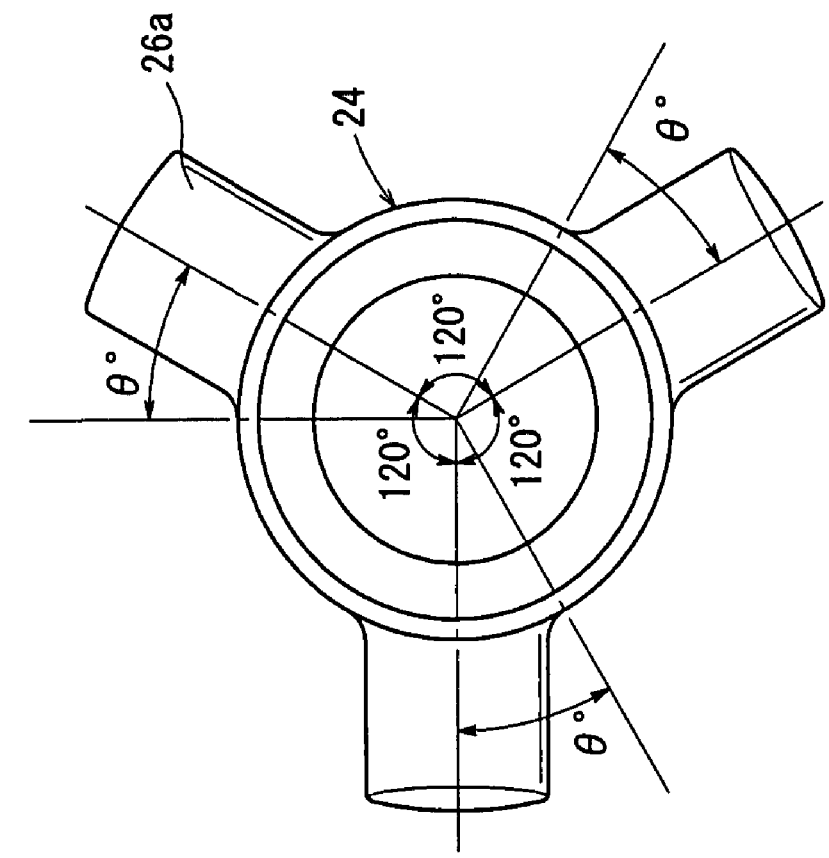

CONSTANT VELOCITY JOINT

TECHNICAL FIELD

The present invention relates to a constant velocity universal joint (constant velocity joint) for connecting one transmission shaft to another transmission shaft in an automotive drive power transmitting mechanism, for example.

BACKGROUND ART

Heretofore, drive power transmitting mechanisms for automobiles have employed a constant velocity universal joint for connecting one transmission shaft to another transmission shaft, in order to transmit rotational power to the axles.

A conventional tripod constant velocity universal joint of the above type basically comprises a tripod including three leg shafts angularly spaced 120 degrees along a circumferential direction and projecting radially outwardly, and cylindrical outer races holding the three leg shafts of the tripod so as to engage within track grooves for rotation in unison with the leg shafts. The tripod constant velocity universal joint is capable of transmitting a rotational torque at a constant-velocity regardless of the operating angle between the two shafts, while allowing the shafts to be relatively displaced in axial directions. Spherical rollers are rotatably mounted on the leg shafts in order to reduce frictional resistance between the leg shafts and the track grooves.

When the conventional tripod constant velocity universal joint transmits a rotational torque through an operating angle formed between the two shafts, the rotational torque is transmitted while spherical rollers on the leg shafts move reciprocally within the track grooves in axial directions of the outer race. The spherical rollers make one reciprocating motion per each revolution (360 degrees) of the outer races and the tripod. During such reciprocating motion, the angle of intersection between the axis of the spherical rollers and the axis of the outer races changes continuously, and the spherical rollers obliquely contact the track grooves. Therefore, the spherical rollers fail to roll smoothly with respect to the track grooves, but tend to move reciprocally while slipping against the track grooves. As a result, frictional force between the contacting members increases.

Stated otherwise, since the three leg shafts of the tripod repeat the same reciprocating motion during each rotational angle of 120 degrees, periodically induced thrust forces are produced in the axial directions of the outer races and the tripod. Such thrust forces resonate with the mount means of the engine, as well as with the transmission or the differential, tending to cause vibrations in the vehicle.

In order to reduce such induced thrust forces, Japanese Laid-Open Patent Publication No. 7-103250 discloses a constant velocity universal joint, wherein each leg shaft is inclined at a first tilt angle with respect to a plane perpendicular to the axis of the tripod. In addition, guide grooves for the outer races are defined at certain angles with respect to the tilted leg shafts, wherein the guide grooves have respective central axes inclined at a second tilt angle with respect to the axis of the tripod.

Japanese Laid-Open Patent Publication No. 11-508673 (PCT Application) discloses a constant velocity universal joint including a joint member, which has three arms (leg shafts) on which rollers are rotatably supported, the three arms being inclined a predetermined angle with respect to a plane perpendicular to the rotational axis of the joint member and the shaft elements.

Japanese Laid-Open Patent Publication No. 7-91457 discloses a constant velocity universal joint including three trunnion journals (leg shafts) having axes angularly spaced 120 degrees along a circumferential direction around the axis of a transmitting shaft, wherein the axes of the trunnion journals are not perpendicular to the axis of the transmitting shaft, but are inclined a predetermined angle with respect thereto.

Japanese Laid-Open Patent Publication No. 61-266830 discloses a constant velocity universal joint, wherein three leg shafts of a tripod are inclined at a given tilt angle with respect to a line perpendicular to the axis of the tripod, on a plane including the axis of the tripod.

Japanese Laid-Open Utility Model Publication No. 63-115927 discloses a constant velocity universal joint, wherein the axes of leg shafts are inclined at a predetermined angle with respect to a vertical plane that extends across the axis of a tripod.

DISCLOSURE OF THE INVENTION

With the constant velocity universal joints disclosed in Japanese Laid-Open Patent Publication No. 7-103250, Japanese Laid-Open Patent Publication No. 11-508673 (PCT Application), Japanese Laid-Open Patent Publication No. 7-91457, Japanese Laid-Open Patent Publication No. 61-266830, and Japanese Laid-Open Utility Model publication No. 63-115927, however, the leg shafts of the tripod must be inclined at the same tilt angle with respect to the plane perpendicular to the axis of the tripod. Machining and material costs for the tripods in these disclosed constant velocity universal joints are higher than tripods that have heretofore been employed.

It is a general object of the present invention to provide a constant velocity universal joint, which reduces induced thrust forces, wherein machining and material costs therefore are reduced.

According to the present invention, the tilt angle of at least one of the trunnions is different from the tilt angles of the other trunnions. Therefore, the first through third trunnions do not operate identically, but operate and reciprocate irregularly. Consequently, the thrust forces induced by third degree rotational components are reduced, thereby suppressing vibrations.

Stated otherwise, according to the conventional art, the thrust forces induced by third degree rotational components are increased, because the first through third leg shafts repeatedly operate and reciprocate identically. According to the present invention, however, since at least one of the trunnions operates differently from the other trunnions, the three trunnions operate out of balance with each other, thereby reducing the thrust forces induced by the third-degree rotational components.

According to the present invention, furthermore, machining and material costs of the constant velocity universal joint can be lowered, because the constant velocity universal joint can be manufactured simply by forming a hole for mounting another transmission shaft therein in a conventional spider, such that the axis of the hole is not perpendicular to the spider, but rather is inclined at a certain angle thereto.

BRIEF DESCRIPTION OF THE DRAWINGS

FIGS. 7A through 7F are vertical cross-sectional views showing the states of leg shafts, while the constant velocity universal joint according to the first comparative example makes one revolution from an initial state, through increments of 60 degrees;

FIG. 23A is a front elevational view showing the manner in which a hole for mounting a second shaft therein is obliquely drilled in a conventional spider while being angularly moved an angle θ clockwise from the position shown in FIG. 21A, and FIG. 23B is a side elevational view thereof.

BEST MODE FOR CARRYING OUT THE INVENTION

Figure 1:
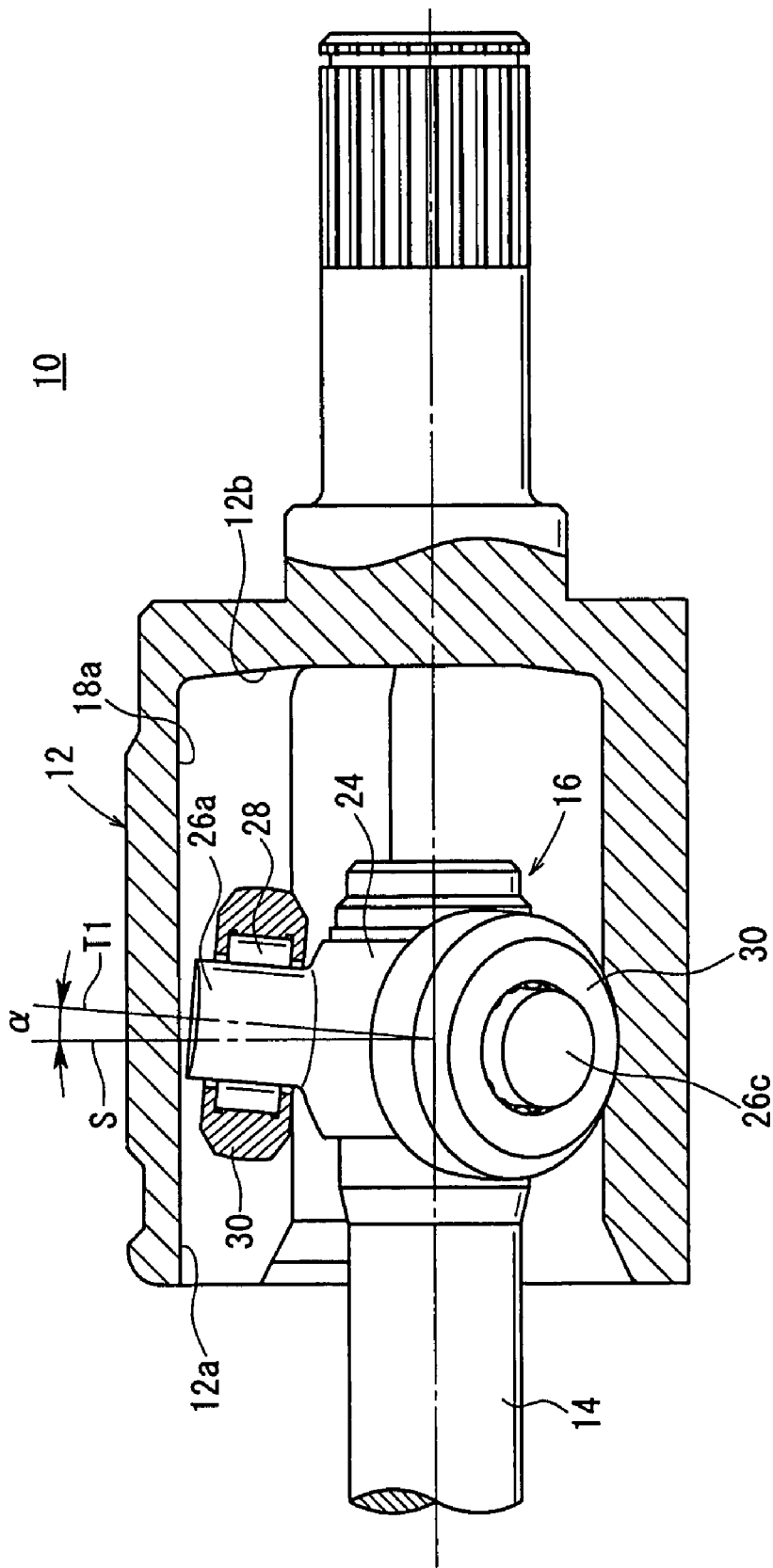
FIG. 1 is a vertical cross-sectional view along an axial direction of a constant velocity universal joint according to an embodiment of the present invention.

In FIGS. 1 through 4, reference character 10 denotes a tripod constant velocity universal joint according to an embodiment of the present invention. The constant velocity universal joint 10 basically comprises a bottomed cylindrical outer cup (outer member) 12 integrally coupled to an end of a first shaft (a transmission shaft), not shown, and an inner member 16 fixed to an end of a second shaft (another transmission shaft) 14 and accommodated in an inner space of the outer cup 12.

The outer cup 12 has an opening 12a defined in one end and a bottom 12b provided at the other closed end thereof.

Figure 2:
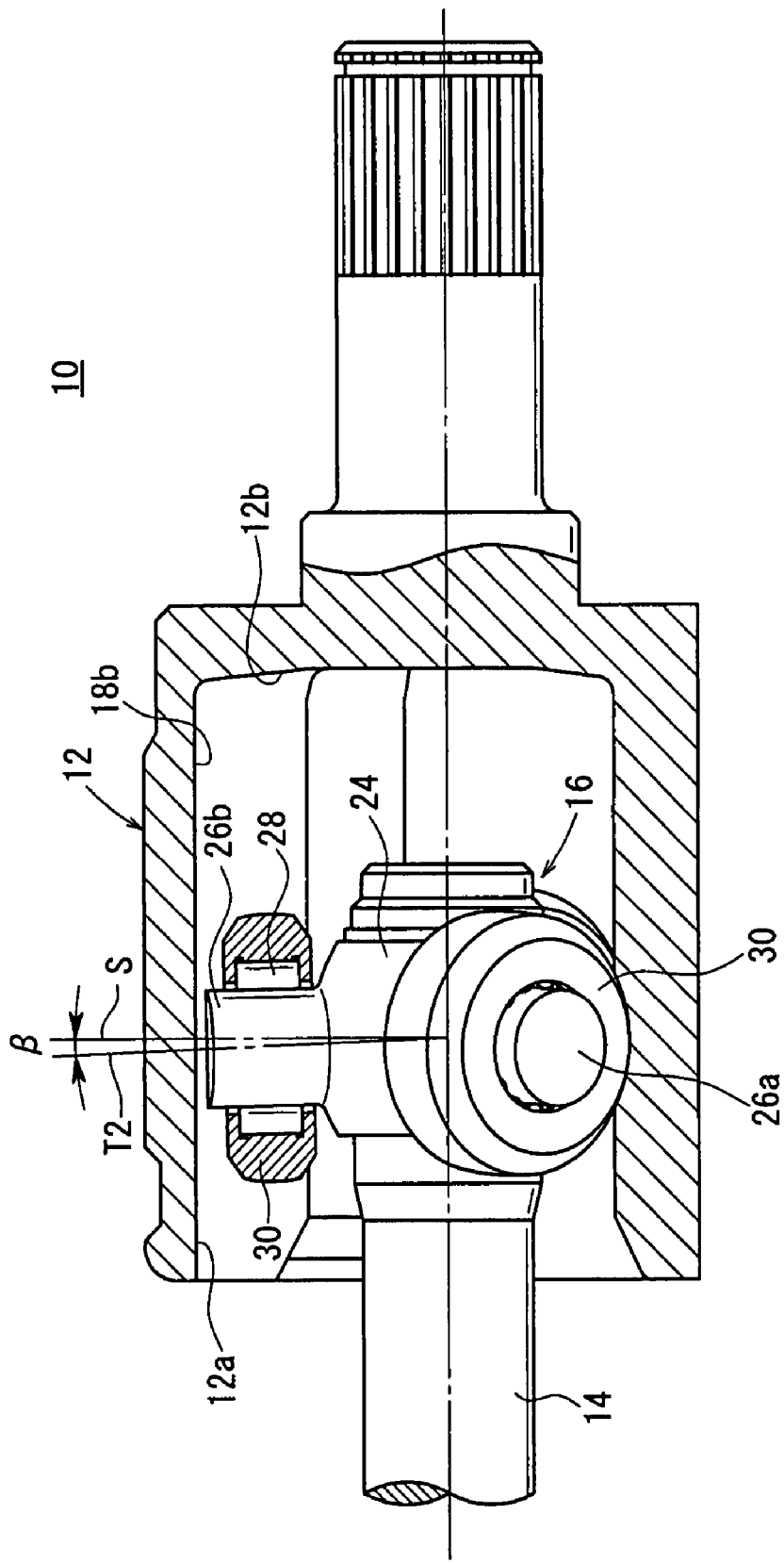
FIG. 2 is a vertical cross-sectional view of the constant velocity universal joint shown in FIG. 1, which is angularly moved 120 degrees about a second shaft.
Figure 3:
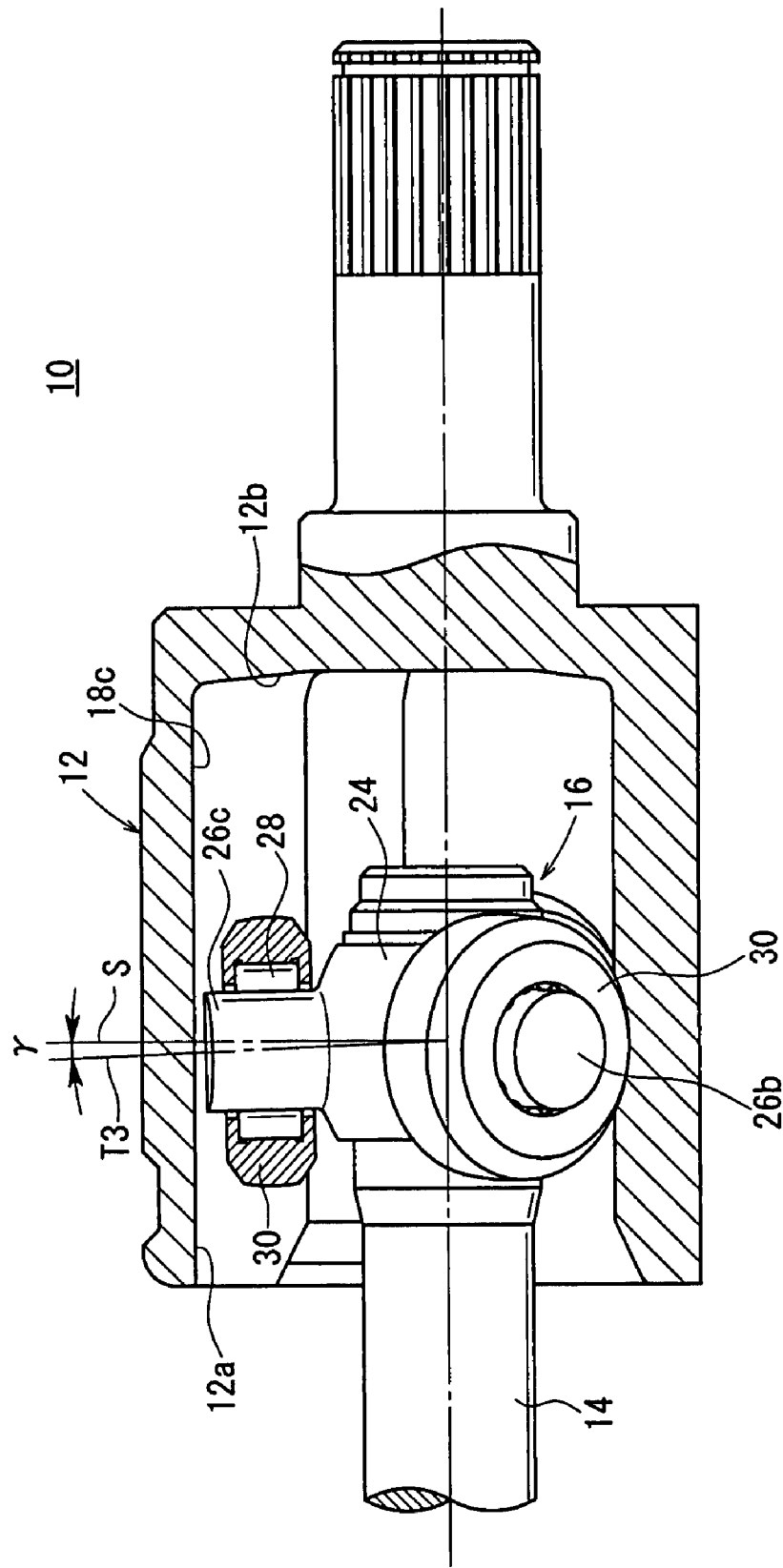
FIG. 3 is a vertical cross-sectional view of the constant velocity universal joint shown in FIG. 2, which is angularly moved 120 degrees about the second shaft.
Figure 4:
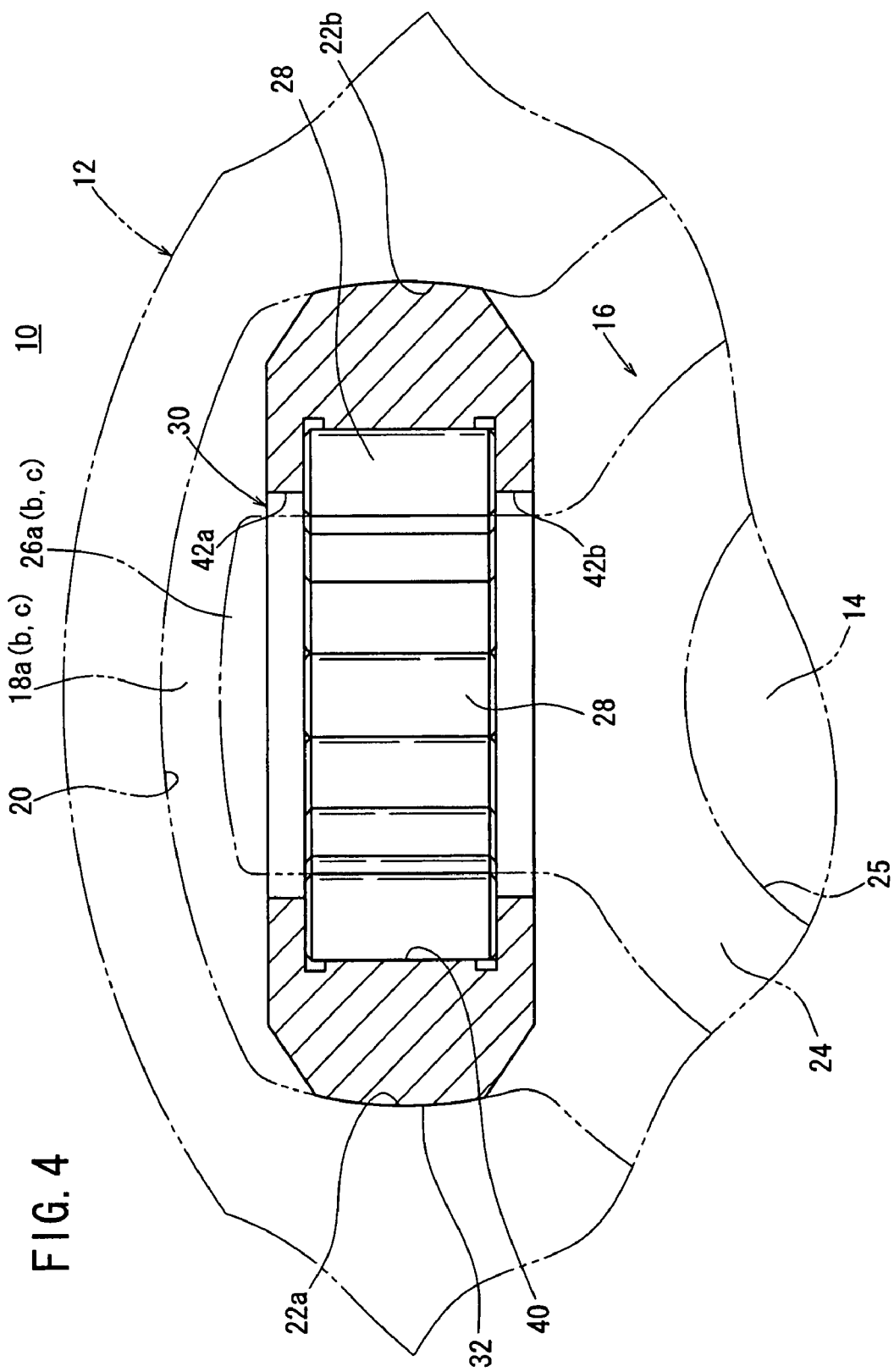
FIG. 4 is an enlarged fragmentary vertical cross-sectional view taken in a direction perpendicular to the axis of the constant velocity universal joint shown in FIG. 1.

As shown in FIGS. 1 through 3, the outer cup 12 has three guide grooves 18a through 18c defined in an inner wall surface thereof extending parallel to the axis of the outer cup 12, wherein the guide grooves 18a through 18c are angularly spaced at 120-degree intervals around the axis of the outer cup 12. As shown in FIG. 4, each of the guide grooves 18a through 18c comprises a ceiling 20 having a curved cross section and a pair of sliding faces 22a, 22b having arcuate cross sections disposed on respective sides of the ceiling 20 in confronting relation to each other.

The inner member 16 comprises a ring-shaped spider 24 fitted over the end of the second shaft 14. The spider 24 has a hole 25 defined centrally therein with the second shaft 14 extending therethrough and secured therein. The hole 25 is defined by an inner wall surface having spline grooves defined therein, not shown. A spline shaft, not shown, on the end of the second shaft 14 is held in mesh with the spline grooves, thereby securing the second shaft 14 and the spider 24 to each other.

The spider 24 has first through third integrally formed trunnions 26a through 26c, wherein outer circumferential surfaces of the trunnions 26a through 26c project into respective guide grooves 18a through 18c at 120-degree intervals around the axis of the spider 24.

Each of the first through third trunnions 26a through 26c includes a cylindrical portion having a substantially constant outside diameter except at its base portion. The first through third trunnions 26a through 26c are set such that if axes of the first through third trunnions 26a through 26c are inclined to a plane perpendicular to the axis of the second shaft 14, then the tilt angle of at least one trunnion is different from the tilt angles of the other two trunnions, and further, the three axes of the first through third trunnions 26a through 26c are positioned on the same plane.

Specifically, as shown in FIG. 1, if the axis (T1) of the first trunnion 26a is inclined at a tilt angle ($\alpha$) with respect to a plane (S) perpendicular to the axis of the second shaft 14, the axis (T2) of the second trunnion 26b is inclined at a tilt angle ($\beta$) with respect to the plane (S) perpendicular to the axis of the second shaft 14, as shown in FIG. 2, and the axis (T3) of the third trunnion 26c is inclined at a tilt angle ($\gamma$) with respect to the plane (S) perpendicular to the axis of the second shaft 14, as shown in FIG. 3, then among the tilt angles ($\alpha$, $\beta$, $\gamma$) of the first through third trunnions 26a through 26c, the tilt angle of at least one of the trunnions is different from the tilt angles of the other two trunnions, and further, the three axes of the first through third trunnions 26a through 26c are positioned on the same plane.

According to the present embodiment, as shown in FIGS. 1 through 3, the tilt angle ($\alpha$) of the first trunnion 26a is different from the tilt angle ($\beta$) of the second trunnion 26b and the tilt angle ($\gamma$) of the third trunnion 26c, the tilt angle ($\beta$) of the second trunnion 26b and the tilt angle ($\gamma$) of the third trunnion 26c are equal to each other ($\alpha \neq \beta$, $\alpha \neq \gamma$, $\beta = \gamma$), and the three axes (T1 through T3) of the first through third trunnions 26a through 26c are contained within the same plane.

Alternatively, the tilt angles ($\alpha$, $\beta$, $\gamma$) of the first through third trunnions 26a through 26c may be different from each other ($\alpha \neq \beta$, $\beta \neq \gamma$, $\alpha \neq \gamma$), while the three axes (T1 through T3) of the first through third trunnions 26a through 26c are contained within the same plane (see FIGS. 23A and 23B).

The tilt angles ($\alpha$, $\beta$, $\gamma$) of the first through third trunnions 26a through 26c may be provided toward the opening 12a of the outer cup 12, or toward the bottom 12b thereof.

As shown in FIG. 4, a ring-shaped roller 30 is rotatably mounted, through a plurality of rolling members 28, on the outer circumferential surface of each of the first through third trunnions 26a (26b, 26c). The axes of the first through third trunnions 26a through 26c and the axes of the corresponding rollers 30 are coaxial, and not eccentric, with respect to each other. The rolling members 28 may comprise rolling bearings, including needles, rolls, or the like.

As shown in FIG. 4, the roller 30 has an outer circumferential surface, including an arcuate surface 32 shaped complementarily to the cross-sectional shapes of the sliding faces 22a, 22b, and which is held in face-to-face contact with the sliding faces 22a, 22b. The arcuate surface 32 has a cross-sectional shape that is symmetrical with respect to the axes (T1 through T3) of the first through third trunnions 26a through 26c.

The roller 30 has an inner circumferential surface, including a radial inner surface 40 having a constant diameter and functioning as a rolling surface for the rolling members 28, together with an annular upper flange 42a and an annular lower flange 42b disposed on opposite ends thereof, respectively, in the axial direction of the radial inner surface 40, and which project a predetermined length radially inwardly.

The rolling members 28 are juxtaposed in parallel with each other circumferentially on the radial inner surface 40 of the roller 30. The rolling members 28 are retained, while prevented from becoming separated and dislodged from the radial inner surface 40, by the upper flange 42a and the lower flange 42b disposed on opposite ends of the radial inner surface 40. The rolling members 28, which are loaded along the radial inner surface 40 of the roller 30, have substantially the same shape and diameter.

The constant velocity universal joint 10 according to the present embodiment is basically constructed as described above. Operations and advantages of the constant velocity universal joint 10 shall be described below.

Firstly, operations of the constant velocity universal joint 10 shall be described.

When the first shaft, not shown, is rotated, the rotational force of the first shaft is transmitted through the outer cup 12 to the inner member 16, thus causing the first through third trunnions 26a through 26c to rotate the second shaft 14 in a given direction.

Specifically, the rotational force of the outer cup 12 is transmitted to the first through third trunnions 26a through 26c through the rollers 30, which are held in face-to-face contact with the sliding faces 22a, 22b of the guide groove 18a (18b, 18c), and to the rolling members 28 retained on the radial inner surfaces 40 of the rollers 30, thereby rotating the second shaft 14 that engages with the first through third trunnions 26a through 26c.

On the assumption that a certain operating angle is formed between the first shaft and the second shaft 14, a mode of operation of the constant velocity universal joint 10 according to the present embodiment depending on rotational angles of the first through third trunnions 26a through 26c thereof shall be described in detail below. In addition, a mode of operation of a constant velocity universal joint 100 according to a first comparative example depending on rotational angles of first through third leg shafts 102a through 102c thereof shall also be described in detail below. Moreover, a mode of operation of a constant velocity universal joint 200 according to a second comparative example depending on rotational angles of first through third leg shafts 202a through 202c thereof shall also be described in detail below. Components, which are identical to those of the constant velocity universal joint 10 according to the present embodiment, are denoted using identical reference characters, and such features shall not be described in detail below.

Figure 5:
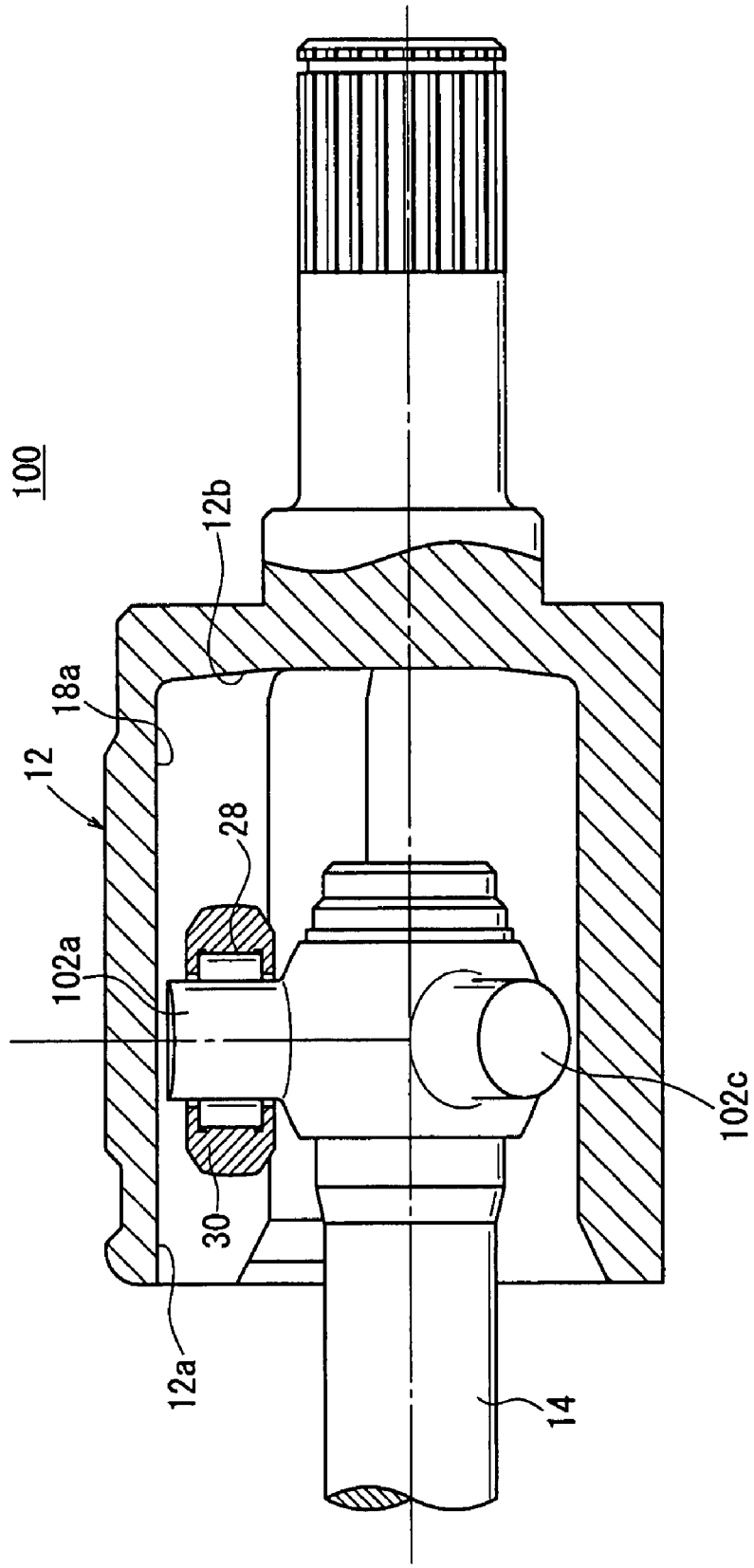
FIG. 5 is a vertical cross-sectional view along an axial direction of a constant velocity universal joint according to a first comparative example.

As shown in FIG. 5, the first through third leg shafts 102a through 102c of the constant velocity universal joint 100 according to the first comparative example have respective axes perpendicular to the axis of the second shaft 14, wherein the axes are positioned on a plane perpendicular to the axis of the second shaft 14.

Figure 6:
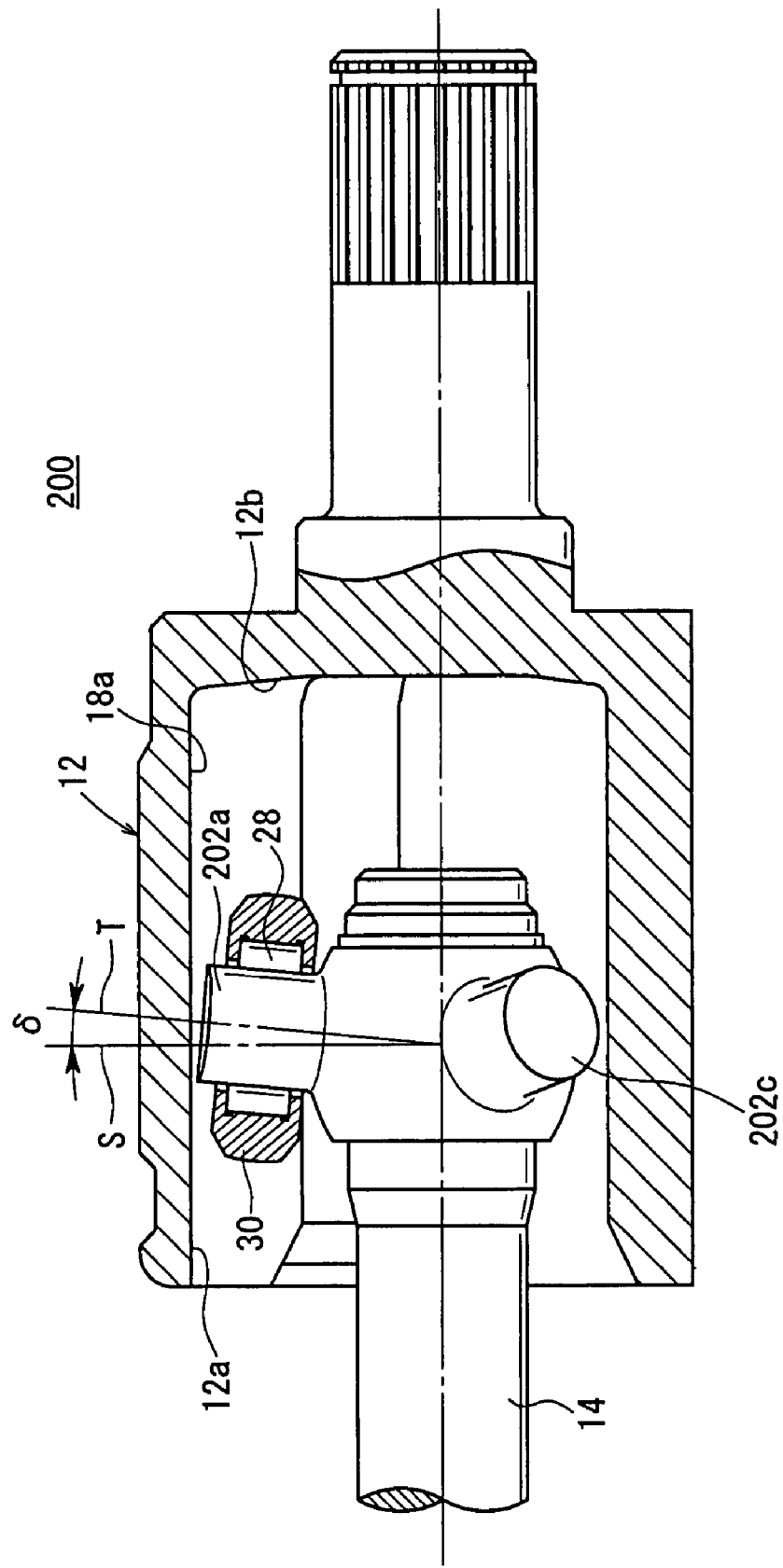
FIG. 6 is a vertical cross-sectional view along an axial direction of a constant velocity universal joint according to a second comparative example.

As shown in FIG. 6, the first through third leg shafts 202a through 202c of the constant velocity universal joint 200 according to the second comparative example have respective axes (T) that are inclined at the same angle ($\delta$) to a plane (S) perpendicular to the axis of the second shaft 14, and which are not positioned on the same plane.

The first and second comparative examples are identical to the present embodiment in that the first through third leg shafts 102a through 102c and 202a through 202c are angularly spaced at 120-degree intervals in the circumferential direction.

The illustrated rotational angles include a 0 degree rotational angle as an initial state, at a time when the axis of the first trunnion 26a (the first leg shafts 102a, 202a) is positioned upwardly in alignment with a vertical line, and rotational angles forming one revolution correspond to increments of 60 degrees in the direction of the arrow (0 degrees→60 degrees→120 degrees→180 degrees→240 degrees→300 degrees→0 degrees).

(1) FIGS. 7A through 7F show states of the leg shafts 102a through 102c of the constant velocity universal joint 100 according to the first comparative example, as the leg shafts 102a through 102c make one revolution from the initial state through increments of 60 degrees.

As shown in FIGS. 7A and 7D, at rotational angles of 0 degrees and 180 degrees, the axis of the first leg shaft 102a that engages within the guide groove 18a is inclined to the vertical plane (the plane perpendicular to the first shaft and the second shaft 14, where the operating angle between the first shaft and the second shaft 14 is 0 degrees [the shafts are coaxial with each other]) at the same tilt angle (A) but in mutually opposite directions.

Specifically, at a rotational angle of 0 degrees, the axis of the first leg shaft 102a is inclined to the vertical plane by the angle (A), in a direction toward the opening 12a of the outer cup 12. At a rotational angle of 180 degrees, the axis of the first leg shaft 102a is inversely inclined to the vertical plane by the same angle (A), in a direction toward the bottom 12b of the outer cup 12.

As shown in FIGS. 7C and 7F, at rotational angles of 120 degrees and 300 degrees, the axis of the second leg shaft 102b that engages within the guide groove 18b is inclined to the vertical plane (the plane perpendicular to the first shaft and the second shaft 14, where the operating angle between the first shaft and the second shaft 14 is 0 degrees [the shafts are coaxial with each other]) at the same tilt angle (A) but in mutually opposite directions. Specifically, at a rotational angle of 120 degrees, the axis of the second leg shaft 102b is inclined to the vertical plane by the angle (A), in a direction toward the opening 12a of the outer cup 12. At a rotational angle of 300 degrees, the axis of the second leg shaft 102b is inversely inclined to the vertical plane by the same angle (A), in a direction toward the bottom 12b of the outer cup 12.

As shown in FIGS. 7B and 7E, at rotational angles of 60 degrees and 240 degrees, the axis of the third leg shaft 102c that engages within the guide groove 18c is inclined to the vertical plane (the plane perpendicular to the first shaft and the second shaft 14, where the operating angle between the first shaft and the second shaft 14 is 0 degrees [the shafts are coaxial with each other]) at the same tilt angle (A) but in mutually opposite directions.

Specifically, at a rotational angle of 60 degrees, the axis of the third leg shaft 102c is inclined to the vertical plane by the angle (A), in a direction toward the opening 12a of the outer cup 12. At a rotational angle of 240 degrees, the axis of the third leg shaft 102c is inversely inclined to the vertical plane by the same angle (A), in a direction toward the bottom 12b of the outer cup 12.

Figure 8:
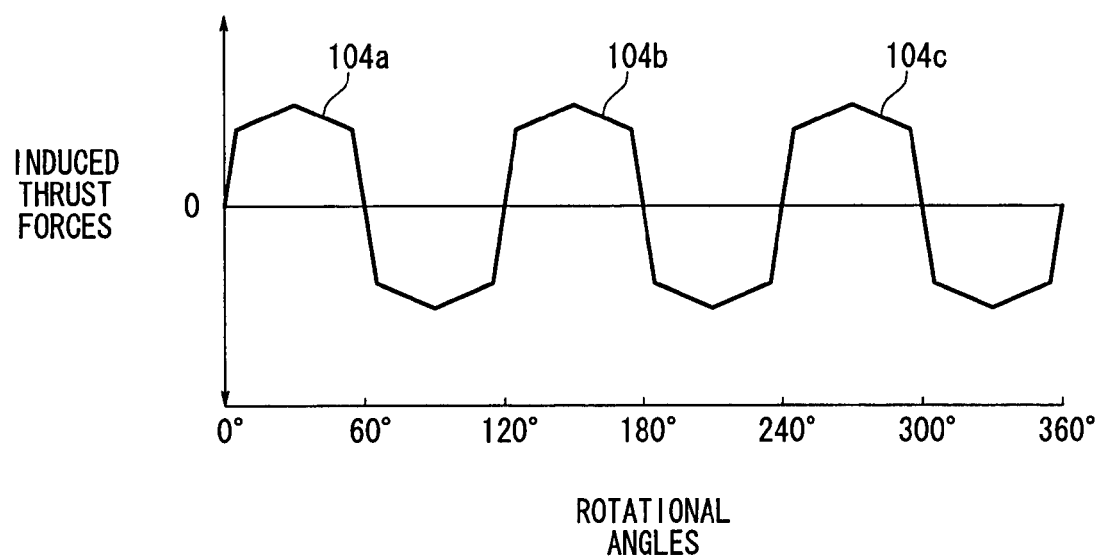
FIG. 8 is a characteristic diagram showing the relationship between rotational angles and induced thrust forces in the first comparative example.

As described above, the constant velocity universal joint 100 according to the first comparative example includes axes of the first through third leg shafts 102a through 102c, which are perpendicular to the axis of the second shaft 14 and positioned on a plane perpendicular to the axis of the second shaft 14. Further, the constant velocity universal joint 100 operates such that the first through third leg shafts 102a through 102c are inclined, respectively, at the same tilt angles (A) toward the opening 12a and the bottom 12b. Accordingly, the first through third leg shafts 102a through 102c operate reciprocally in the same fashion depending on the angle of rotation. Such operation is confirmed from FIG. 8, which shows that the first through third waveforms 104a through 104c of the induced thrust forces, corresponding to the first through third leg shafts 102a through 102c during one revolution, are substantially identical to each other.

(2) FIGS. 9A through 9F show states of the leg shafts 202a through 202c of the constant velocity universal joint 200 according to the second comparative example, as the leg shafts 202a through 202c make one revolution from the initial state through increments of 60 degrees.

Figure 9A:
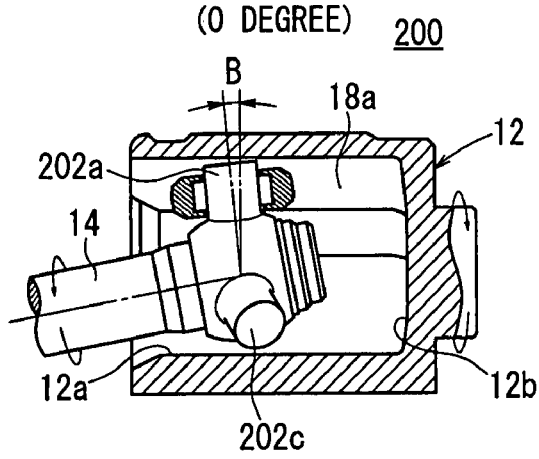
FIGS. 9A through 9F are vertical cross-sectional views showing the states of leg shafts, while the constant velocity universal joint according to the second comparative example makes one revolution from an initial state, through increments of 60 degrees.
Figure 9B:
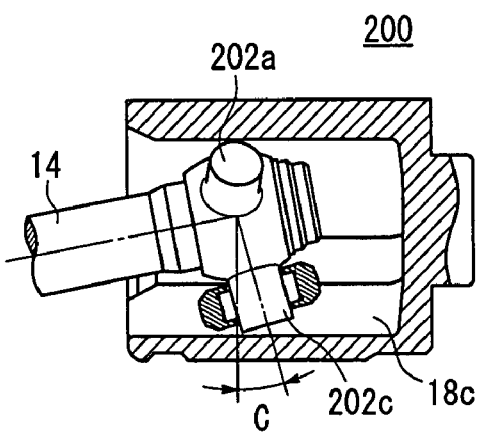
Figure 9C:
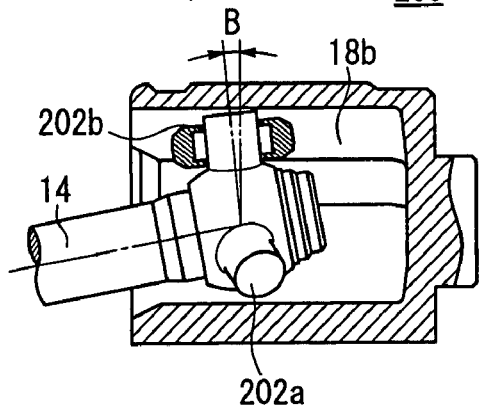
Figure 9D:
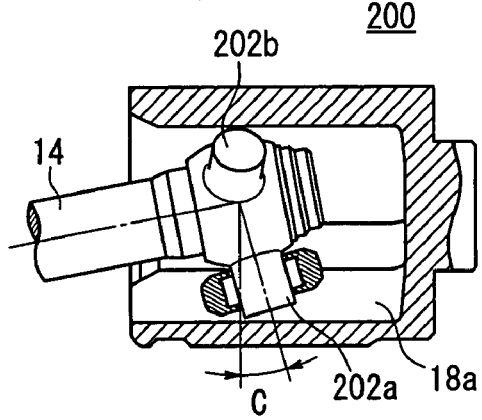

As shown in FIGS. 9A and 9D, at rotational angles of 0 degrees and 180 degrees, the axis of the first leg shaft 202a that engages within the guide groove 18a is inclined to the vertical plane (the plane perpendicular to the first shaft and the second shaft 14, where the operating angle between the first shaft and the second shaft 14 is 0 degrees [the shafts are coaxial with each other]) by different angles and in mutually opposite directions. Specifically, at a rotational angle of 0 degrees, the axis of the first leg shaft 202a is slightly inclined to the vertical plane by the tilt angle (B), in a direction toward the opening 12a of the outer cup 12. At a rotational angle of 180 degrees, the axis of the first leg shaft 202a is inversely inclined to the vertical plane by the angle (C), which is greater than the tilt angle (B), in a direction toward the bottom 12b of the outer cup 12.

Figure 9E:
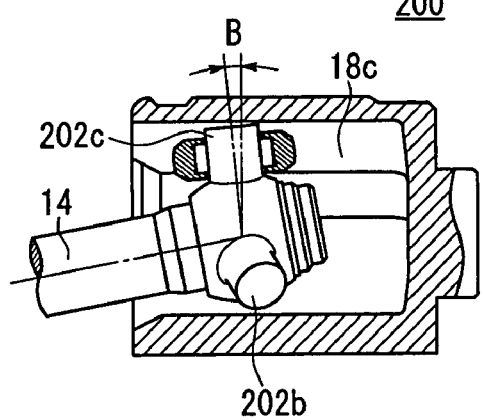
Figure 9F:
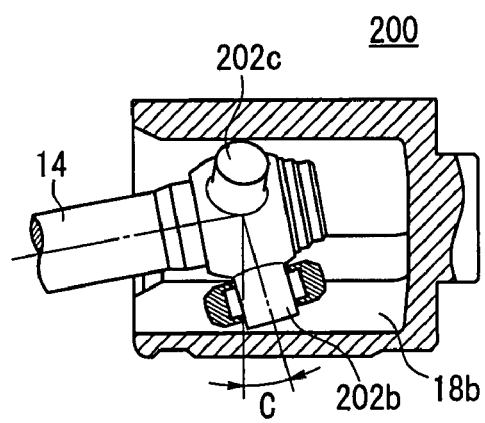

As shown in FIGS. 9C and 9F, at rotational angles of 120 degrees and 300 degrees, the axis of the second leg shaft 202b that engages within the guide groove 18b is inclined to the vertical plane (the plane perpendicular to the first shaft and the second shaft 14, where the operating angle between the first shaft and the second shaft 14 is 0 degrees [the shafts are coaxial with each other]) by different angles and in mutually opposite directions. Specifically, at a rotational angle of 120 degrees, the axis of the second leg shaft 202b is slightly inclined to the vertical plane by the tilt angle (B), in a direction toward the opening 12a of the outer cup 12. At the rotational angle of 300 degrees, the axis of the second leg shaft 202b is inversely inclined to the vertical plane by the angle (C), which is greater than the tilt angle (B), in a direction toward the bottom 12b of the outer cup 12.

As shown in FIGS. 9B and 9E, at rotational angles of 60 degrees and 240 degrees, the axis of the third leg shaft 202c that engages within the guide groove 18c is inclined to the vertical plane (the plane perpendicular to the first shaft and the second shaft 14, where the operating angle between the first shaft and the second shaft 14 is 0 degrees [the shafts are coaxial with each other]) by different angles and in mutually opposite directions. Specifically, at a rotational angle of 60 degrees, the axis of the third leg shaft 202c is inclined to the vertical plane by the tilt angle (C), in a direction toward the bottom 12b of the outer cup 12. At the rotational angle of 240 degrees, the axis of the third leg shaft 202c is inversely inclined to the vertical plane by the angle (B), which is smaller than the tilt angle (C), in a direction toward the opening 12a of the outer cup 12.

Figure 10:
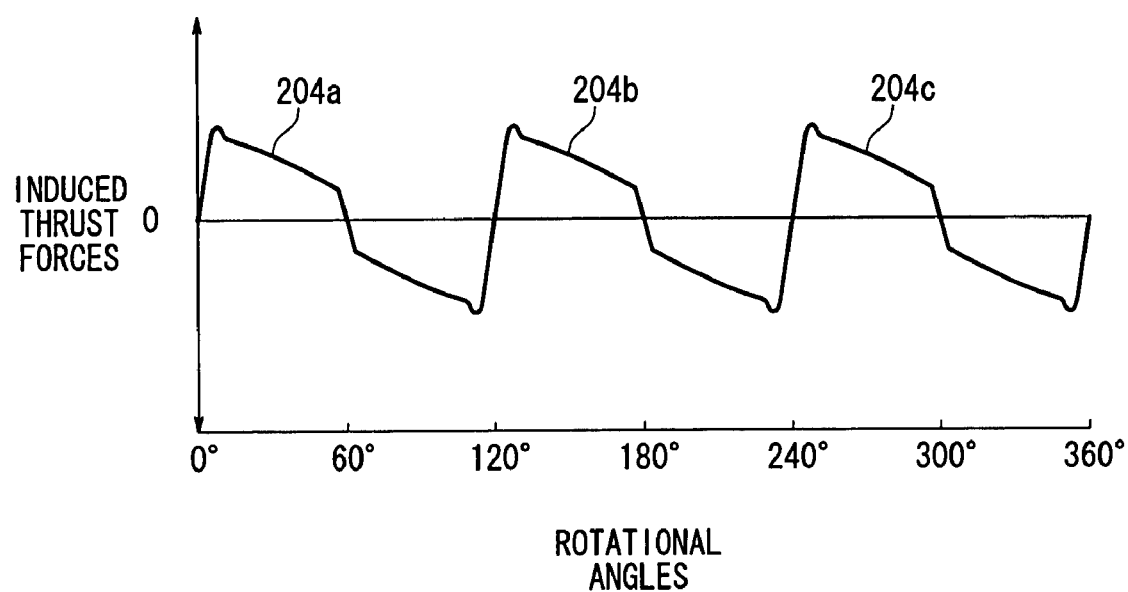
FIG. 10 is a characteristic diagram showing the relationship between rotational angles and induced thrust forces in the second comparative example.

As described above, the constant velocity universal joint 200 according to the second comparative example includes axes of the first through third leg shafts 202a through 202c, which are perpendicular to the axis of the second shaft 14 and inclined at the same angles with respect to the plane perpendicular to the axis of the second shaft 14. Further, the constant velocity universal joint 200 operates such that the first through third leg shafts 202a through 202c are inclined, respectively, at the same tilt angles (B, C) toward the opening 12a and the bottom 12b. Accordingly, the first through third leg shafts 202a through 202c operate in the same fashion depending on the angle of rotation. Such operation is confirmed from FIG. 10, which shows that the first through third waveforms 204a through 204c of the induced thrust forces, corresponding to the first through third leg shafts 202a through 202c during one revolution, are substantially identical to each other.

(3) FIGS. 11A through 11F show states of the first through third trunnions 26a through 26c of the constant velocity universal joint 10 according to the present embodiment, as the first through third trunnions 26a through 26c make one revolution from the initial state through increments of 60 degrees.

Figure 11A:
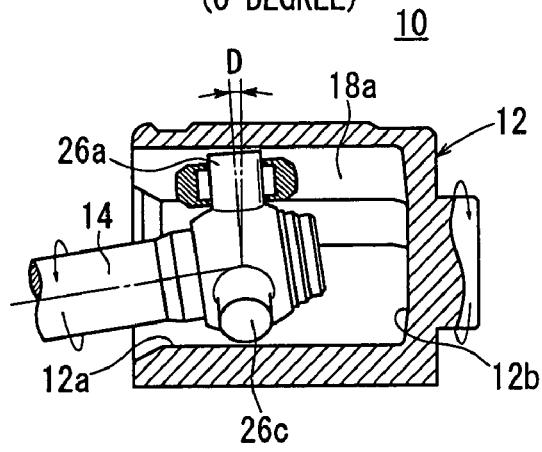
FIGS. 11A through 11F are vertical cross-sectional views showing the states of trunnions, while the constant velocity universal joint according to the present embodiment makes one revolution from an initial state, through increments of 60 degrees.
Figure 11B:
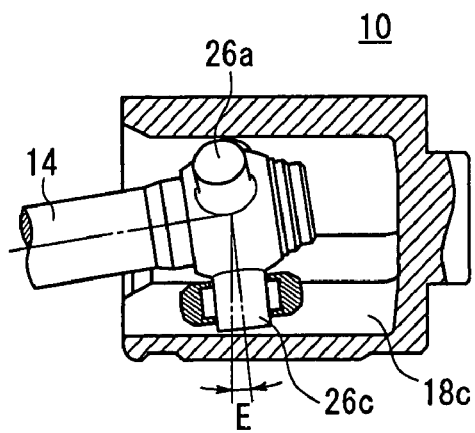
Figure 11C:
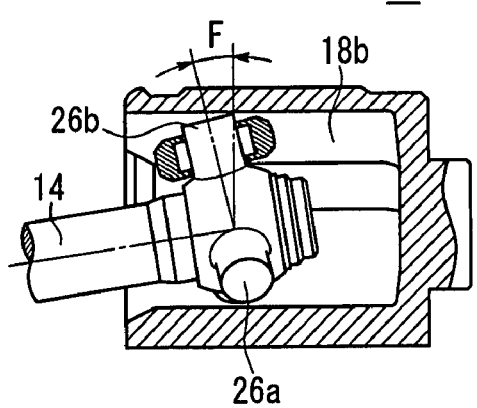
Figure 11D:
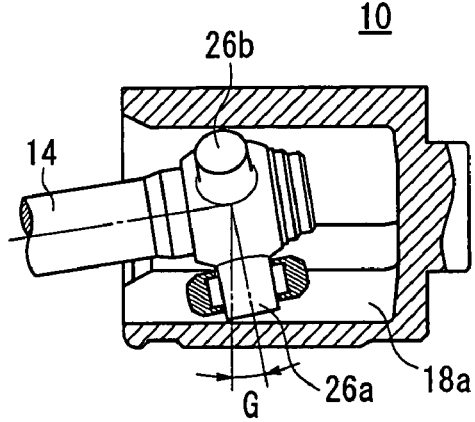

As shown in FIGS. 11A and 11D, at rotational angles of 0 degrees and 180 degrees, the axis of the first trunnion 26a that engages within the guide groove 18a is inclined to the vertical plane (the plane perpendicular to the first shaft and the second shaft 14, where the operating angle between the first shaft and the second shaft 14 is 0 degrees [the shafts are coaxial with each other]) by different angles and in mutually opposite directions. Specifically, at a rotational angle of 0 degrees, the axis of the first trunnion 26a is slightly inclined to the vertical plane by the tilt angle (D), in a direction toward the opening 12a of the outer cup 12. At a rotational angle of 180 degrees, the axis of the first trunnion 26a is inversely inclined to the vertical plane by the angle (G), in a direction toward the bottom 12b of the outer cup 12.

Figure 11E:
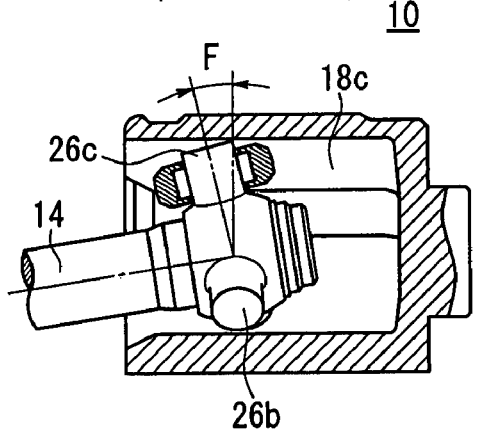
Figure 11F:
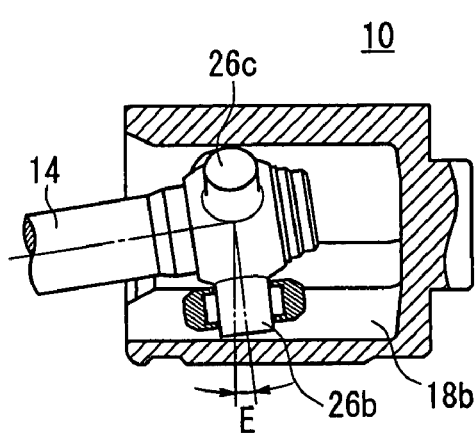

As shown in FIGS. 11C and 11F, at rotational angles of 120 degrees and 300 degrees, the axis of the second trunnion 26b that engages within the guide groove 18b is inclined to the vertical plane (the plane perpendicular to the first shaft and the second shaft 14, where the operating angle between the first shaft and the second shaft 14 is 0 degrees [the shafts are coaxial with each other]) by angles which are different from the tilt angles (D, G) of the first trunnion 26a. Specifically, at a rotational angle of 120 degrees, the axis of the second trunnion 26b is inclined to the vertical plane by the tilt angle (F), which is greater than the tilt angle (D) of the first trunnion 26a (D<F), in a direction toward the opening 12a of the outer cup 12. At a rotational angle of 300 degrees, the axis of the second trunnion 26b is inversely inclined to the vertical plane by the angle (E), which is smaller than the tilt angle (G) of the first trunnion 26a (G>E), in a direction toward the bottom 12b of the outer cup 12.

As shown in FIGS. 11B and 11E, at rotational angles of 60 degrees and 240 degrees, the axis of the third trunnion 26c that engages within the guide groove 18c is inclined to the vertical plane (the plane perpendicular to the first shaft and the second shaft 14, where the operating angle between the first shaft and the second shaft 14 is 0 degrees [the shafts are coaxial with each other]) by angles which are different from the tilt angles (D, G) of the first trunnion 26a and identical to the tilt angles (F, E) of the second trunnion 26b. Specifically, at a rotational angle of 60 degrees, the axis of the third trunnion 26c is slightly inclined to the vertical plane by the tilt angle (E), which is smaller than the tilt angle (G) of the first trunnion 26a (G>E), in a direction toward the bottom 12b of the outer cup 12. At a rotational angle of 240 degrees, the axis of the third trunnion 26c is inversely inclined to the vertical plane by the angle (F), which is greater than the tilt angle (D) of the first trunnion 26a (D<F), in a direction toward the opening 12a of the outer cup 12.

Figure 12:
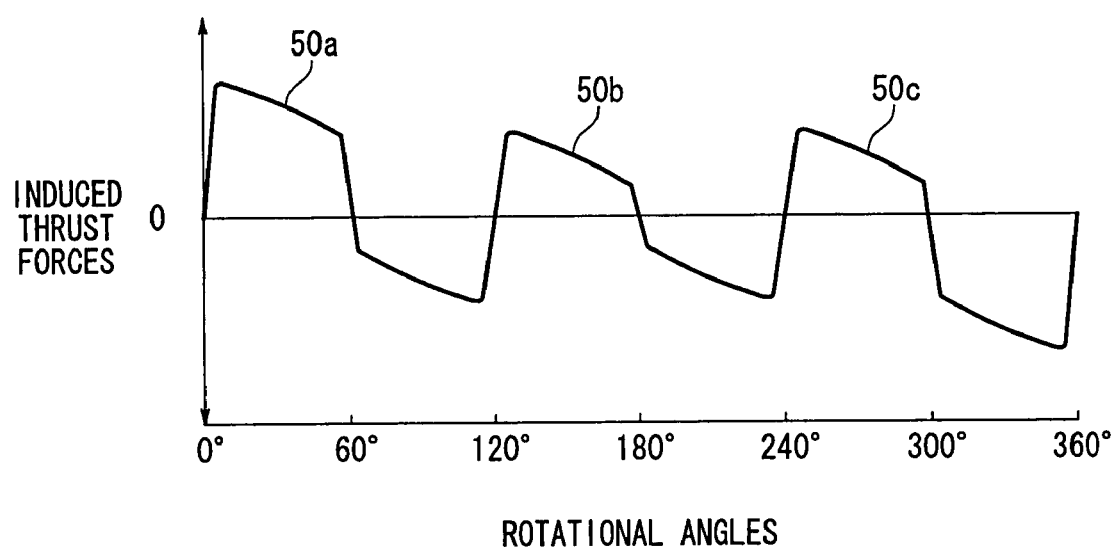
FIG. 12 is a characteristic diagram showing the relationship between rotational angles and induced thrust forces in the present embodiment.

As described above, in the constant velocity universal joint 100 according to the present embodiment, only the first trunnion 26a is inclined at a tilt angle different from the second trunnion 26b and the third trunnion 26c, and the second trunnion 26b and the third trunnion 26c are inclined at the same tilt angle. Further, the axes of the first through third trunnions 26a through 26c are positioned on the same plane. Accordingly, the constant velocity universal joint 100 operates such that the first trunnion 26a is inclined, respectively, at different angles toward the opening 12a and the bottom 12b, compared with the second trunnion 26b and the third trunnion 26c, and only the first trunnion 26a operates reciprocally differently from the second and third trunnions 26b, 26c depending on the angle of rotation. Such operation is confirmed from FIG. 12, which shows a first waveform 50a of an induced thrust force corresponding to the first trunnion 26a during one revolution, which is different from second and third waveforms 50b, 50c of the induced thrust forces corresponding to the second and third trunnions 26b, 26c.

According to the present embodiment, it can be seen that the second trunnion 26b and the third trunnion 26c operate in the same manner, inasmuch as the second waveform 50b and the third waveform 50c of induced thrust forces, corresponding to operations of the second trunnion 26b and the third trunnion 26c, are essentially identical to each other.

Simulation results of the constant velocity universal joint 100 according to the first comparative example, and the constant velocity universal joint 10 according to the present embodiment, are shown in FIGS. 13 through 20. Simulations were conducted for an operating angle (joint angle) of 8 degrees between the first shaft and the second shaft 14.

Figure 13:
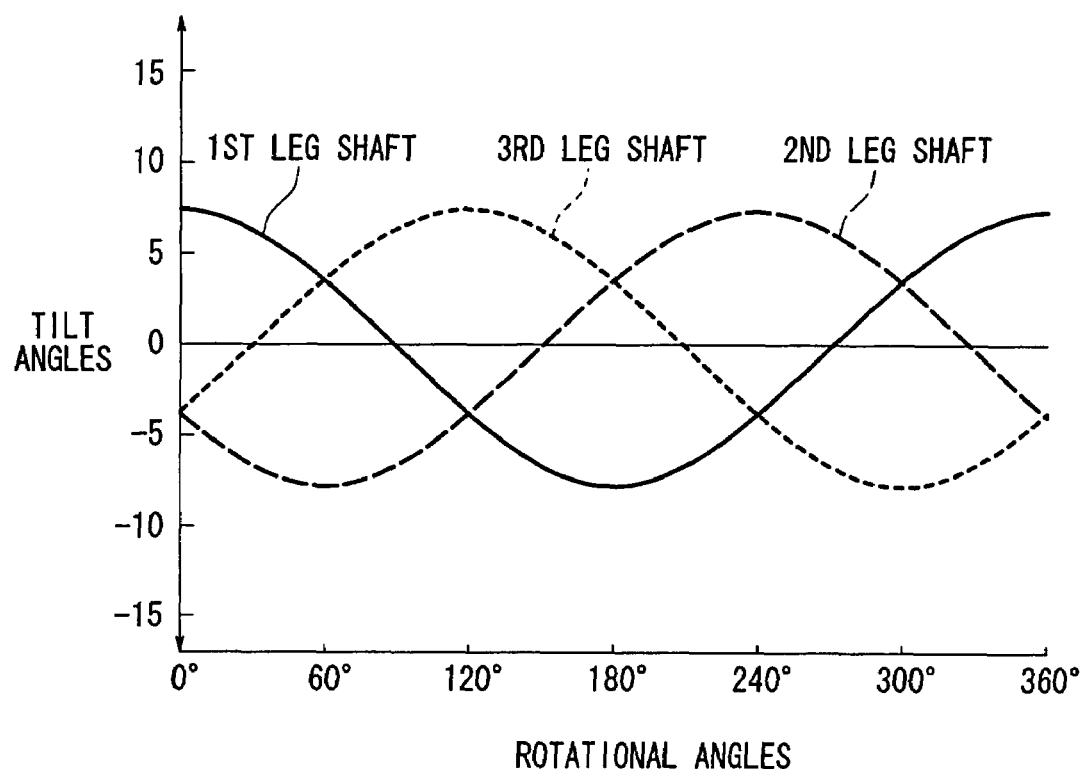
FIG. 13 is a characteristic diagram showing the relationship between rotational angles and first through third leg shafts of the constant velocity universal joint according to the first comparative example.
Figure 14:
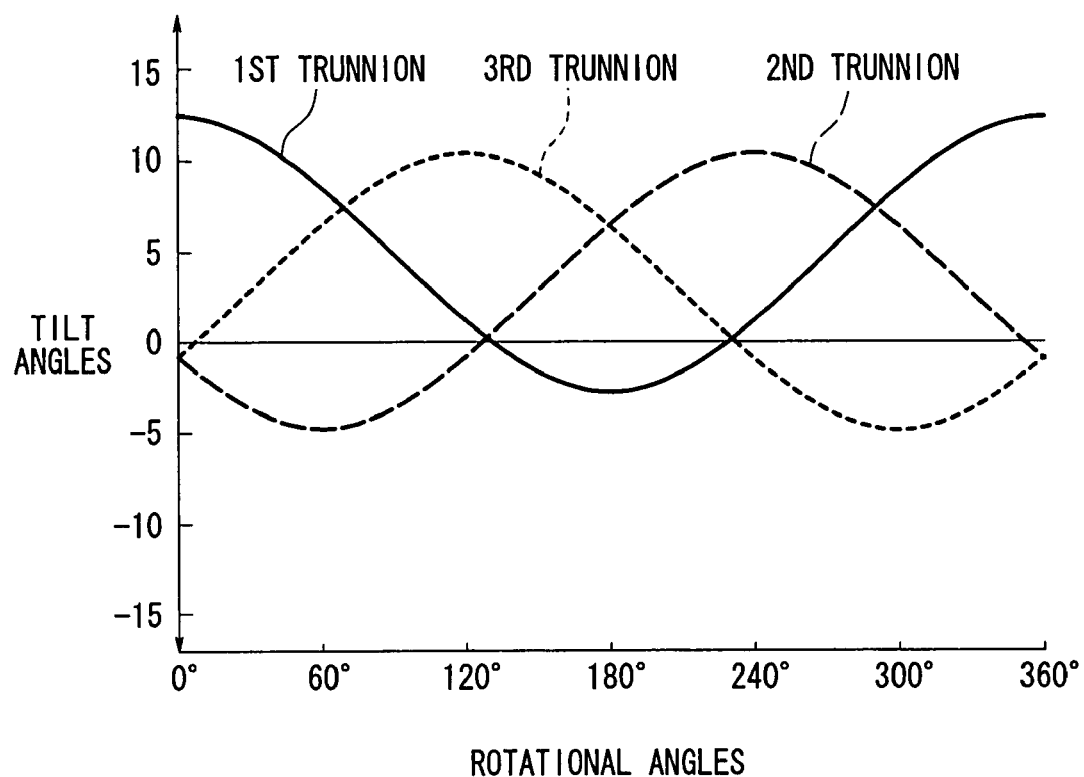
FIG. 14 is a characteristic diagram showing the relationship between rotational angles and first through third trunnions of the constant velocity universal joint according to the present embodiment.

FIGS. 13 and 14 show the relationship between the rotational angle and tilt angles of the first through third trunnions 26a through 26c (the first through third leg shafts 102a through 102c), according to the first comparative example and the present embodiment.

Figure 15:
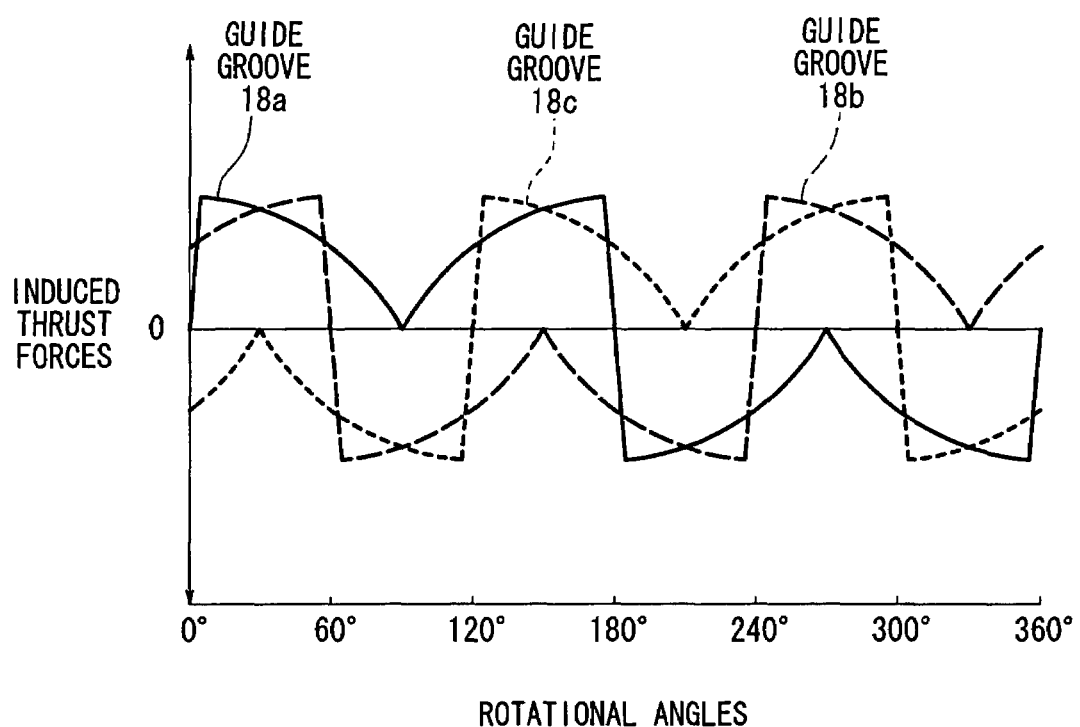
FIG. 15 is a characteristic diagram showing the relationship between rotational angles and induced thrust forces applied to guide grooves of the constant velocity universal joint according to the first comparative example.
Figure 16:
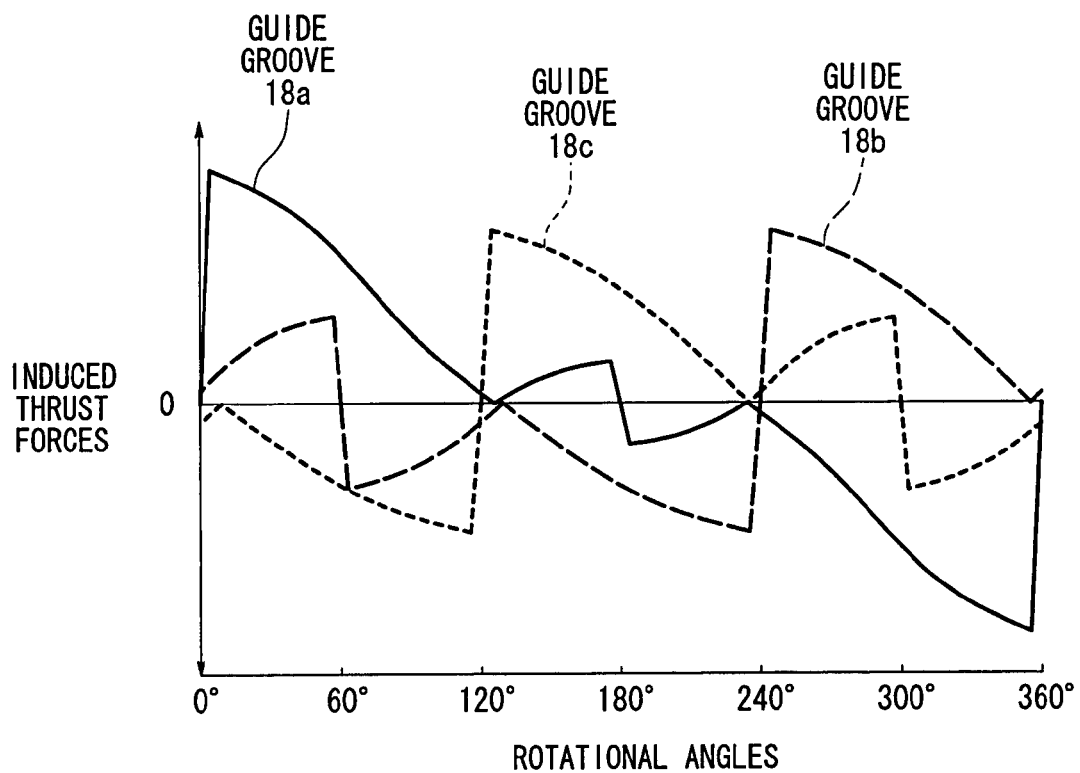
FIG. 16 is a characteristic diagram showing the relationship between rotational angles and induced thrust forces applied to guide grooves of the constant velocity universal joint according to the present embodiment.

FIGS. 15 and 16 show the relationship between the rotational angle and the induced thrust forces applied to the guide groove 18a (18b, 18c), according to the first comparative example and the present embodiment.

Figure 17:
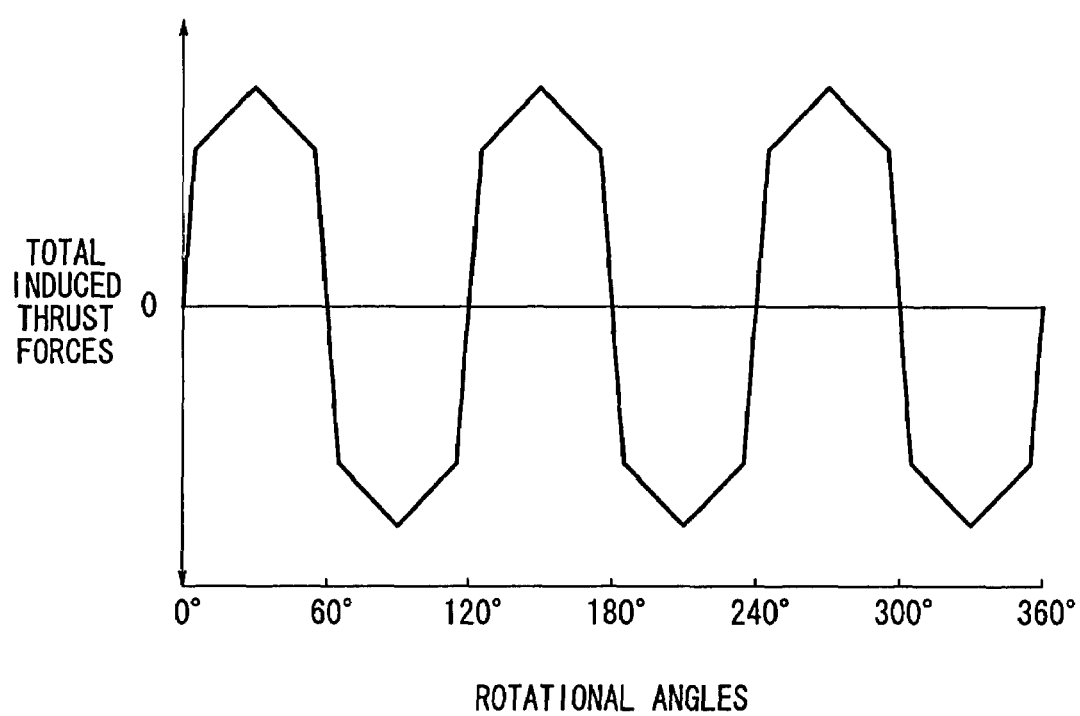
FIG. 17 is a characteristic diagram showing the relationship between rotational angles and total induced thrust forces applied to the guide grooves of the constant velocity universal joint according to the first comparative example.
Figure 18:
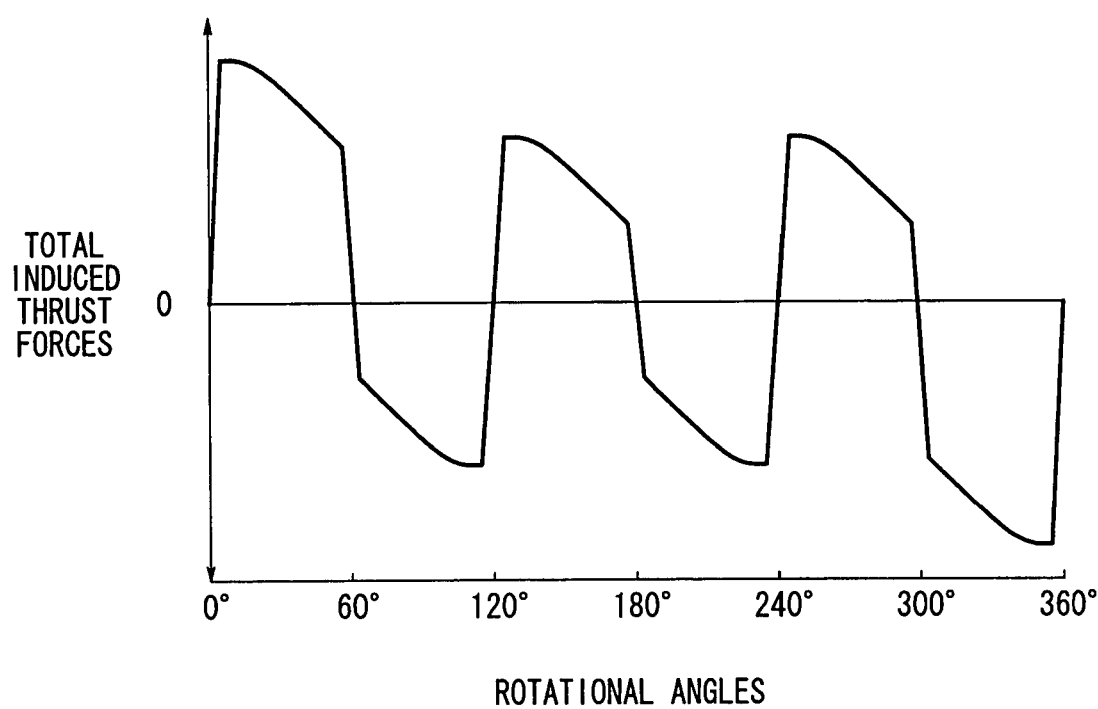
FIG. 18 is a characteristic diagram showing the relationship between rotational angles and total induced thrust forces applied to the guide grooves of the constant velocity universal joint according to the present embodiment.

FIGS. 17 and 18 show the relationship between the rotational angle and the total induced thrust forces applied to the guide grooves 18a through 18c, according to the first comparative example and the present embodiment.

Figure 19:
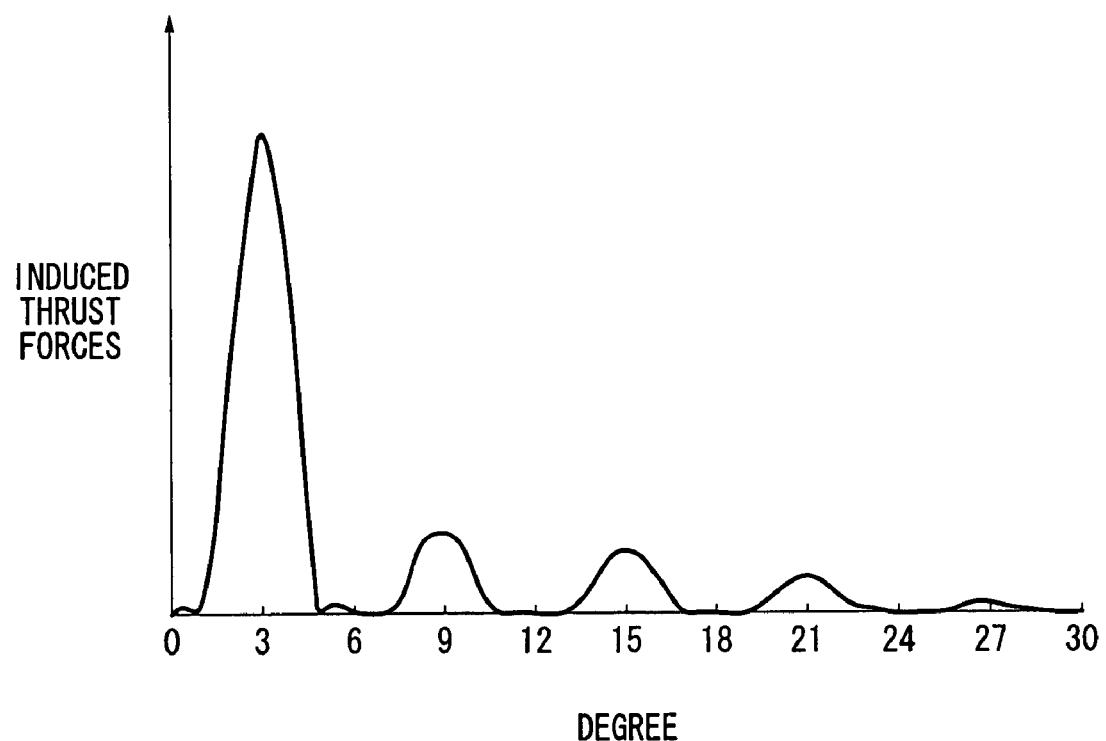
FIG. 19 is a characteristic diagram showing the relationship between the degree of rotation and induced thrust forces of the constant velocity universal joint according to the first comparative example.
Figure 20:
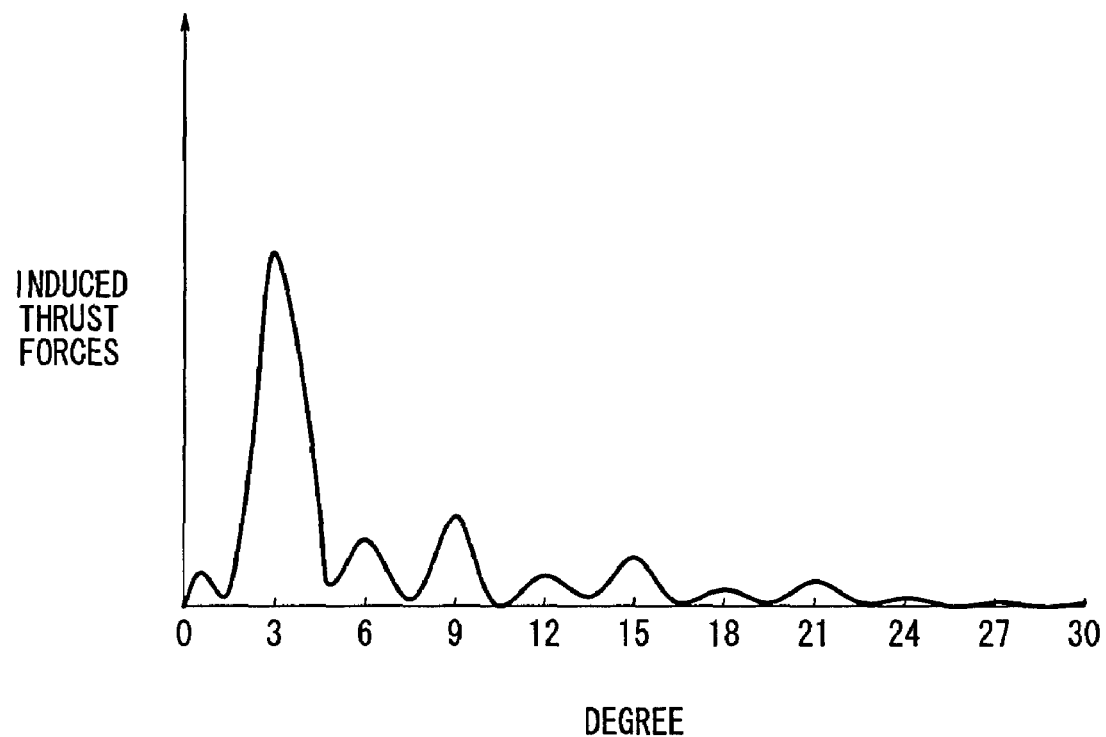
FIG. 20 is a characteristic diagram showing the relationship between the degree of rotation and induced thrust forces of the constant velocity universal joint according to the present embodiment.

FIGS. 19 and 20 show the relationship between the degree of rotation and the induced thrust forces, according to the first comparative example and the present embodiment.

As shown in FIGS. 19 and 20, comparing the induced thrust forces of the third degree rotational component according to the first comparative example and the induced thrust forces of the third degree rotational component according to the present embodiment, it is seen that the induced thrust forces of the third degree rotational component according to the present embodiment are smaller than those according to the first comparative example, in that the peaks in the third degree rotational component are lower according to the present embodiment.

According to the present embodiment, therefore, the first through third trunnions 26a through 26c do not operate identically, but rather operate reciprocally and irregularly, because the tilt angle of at least one of the trunnions is different from the tilt angles of the other trunnions. Consequently, the induced thrust forces of the third degree rotational component are reduced for thereby suppressing vibrations.

Stated otherwise, the constant velocity universal joints 100, 200 according to the first and second comparative examples develop increased induced thrust forces of the third degree rotational component because the first through third leg shafts 102a through 102c and 202a through 202c repeatedly operate reciprocally and identically. According to the present embodiment, however, since at least one of the trunnions operates differently from the other trunnions, the three trunnions operate out of balance with each other, thereby reducing the induced thrust forces of the third degree rotational component.

Figure 21B:
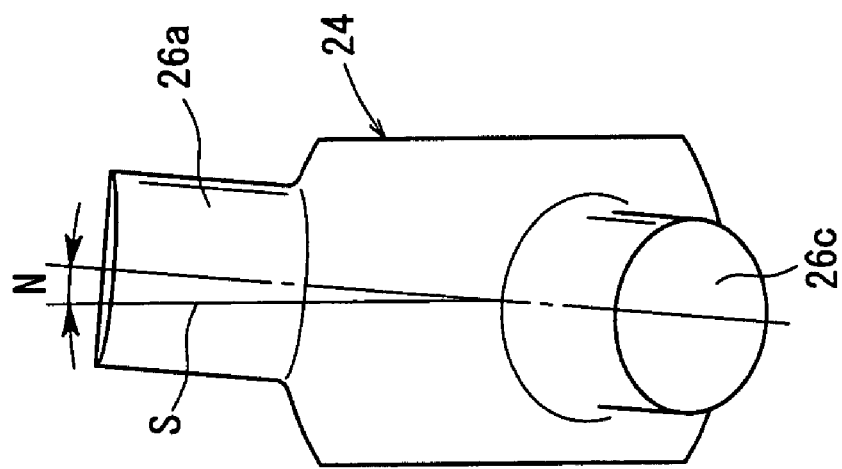
FIG. 21B is a side elevational view thereof.
Figure 21A:
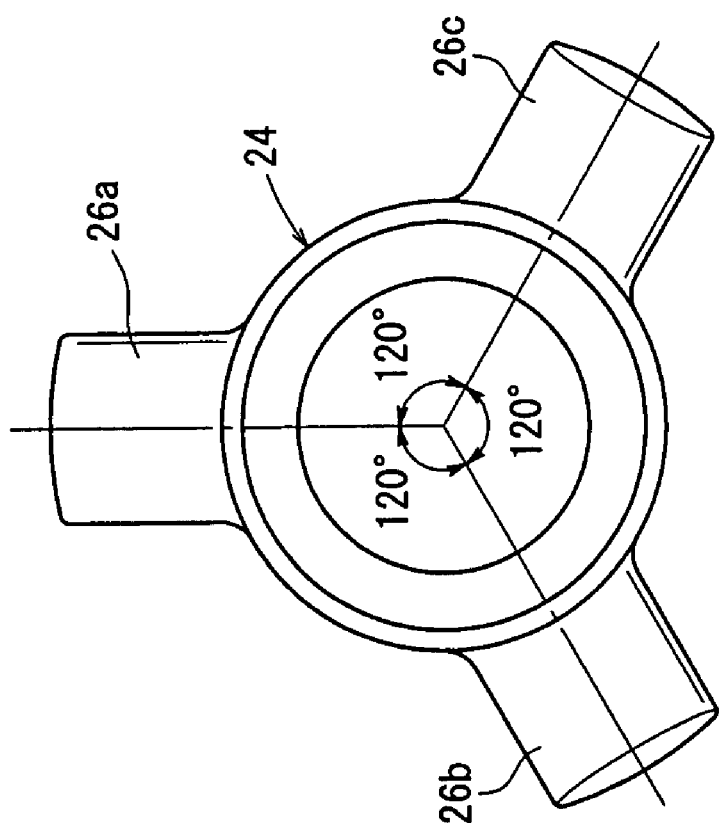
FIG. 21A is a front elevational view showing the manner in which a hole for mounting a second shaft therein is obliquely drilled in a conventional spider.
Figure 22:
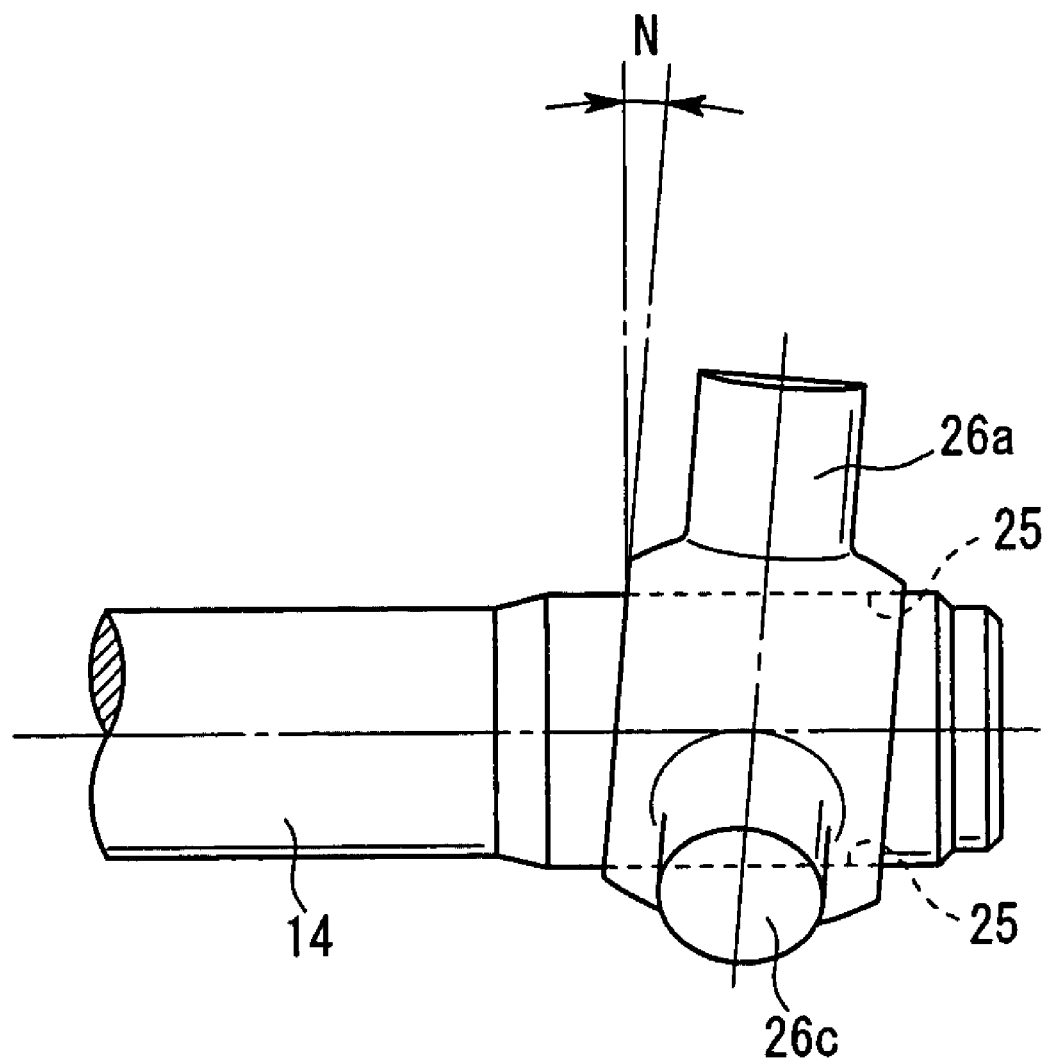
FIG. 22 is a side elevational view showing the manner in which the second shaft is mounted in the hole formed in the spider.

As shown in FIGS. 21A and 21B, furthermore, the constant velocity universal joint 10 according to the present embodiment employs a conventional spider 24, having three projecting first through third trunnions 26a through 26c. While the entire spider 24 is inclined at a given angle (N) to the vertical plane (S), with the first trunnion 26a positioned upwardly, a hole 25 is obliquely drilled centrally through the spider 24 in order for the second shaft 14 to extend therethrough (see FIG. 22). In this manner, the constant velocity universal joint 10 according to the present embodiment is manufactured such that only the tilt angle ($\alpha$) of the first trunnion 26a is different from the tilt angles ($\beta$, $\gamma$) of the second and third trunnions 26b, 26c ($\alpha \neq \beta$, $\alpha \neq \gamma$, $\beta = \gamma$).

Machining and material costs for the constant velocity universal joint 10 according to the present embodiment can be lowered, since the constant velocity universal joint 10 can be manufactured simply by forming the hole 25 for mounting the second shaft 14 therein in the conventional spider 24, such that the axis of the hole 25 is not perpendicular to the spider 24, but is inclined at a certain angle thereto. Specifically, according to the present embodiment, the projecting first through third trunnions 26a through 26c of the spider 24 are not inclined, but the hole 25 defined centrally in the spider 24 is obliquely drilled. Accordingly, the constant velocity universal joint 10 can be manufactured easily.

As shown in FIGS. 23A and 23B, while the spider 24 is being turned an angle θ clockwise from an initial state, in which the first trunnion 26a is positioned upwardly, and while the spider 24 as a whole is inclined at a certain angle with respect to the vertical plane, as in FIGS. 21A and 21B, the mounting hole 25 for the second shaft 14 is formed centrally through the spider 24, thereby causing the tilt angles of the axes of the first through third trunnions 26a through 26c to be different from each other (α≠β, β≠γ, α≠γ).

According to the present embodiment, moreover, the constant velocity universal joint is advantageous, compared with the unillustrated conventional tripod constant velocity universal joint, or with the conventional tripod constant velocity universal joints disclosed in Japanese Laid-Open Patent Publication No. 7-103250, Japanese Laid-Open Patent Publication No. 11-508673 (PCT Application), Japanese Laid-Open Patent Publication No. 7-91457, Japanese Laid-Open Patent Publication No. 61-266830, and Japanese Laid-Open Utility Model Publication No. 63-115927, in that durability thereof can be increased, since the amount of movement of the rollers 30 increases although the operating angle formed between the first shaft and the second shaft 14 remains the same, wherein the axes of the three trunnions extend along the plane perpendicular to the axis of the second axis.

Figure 24:
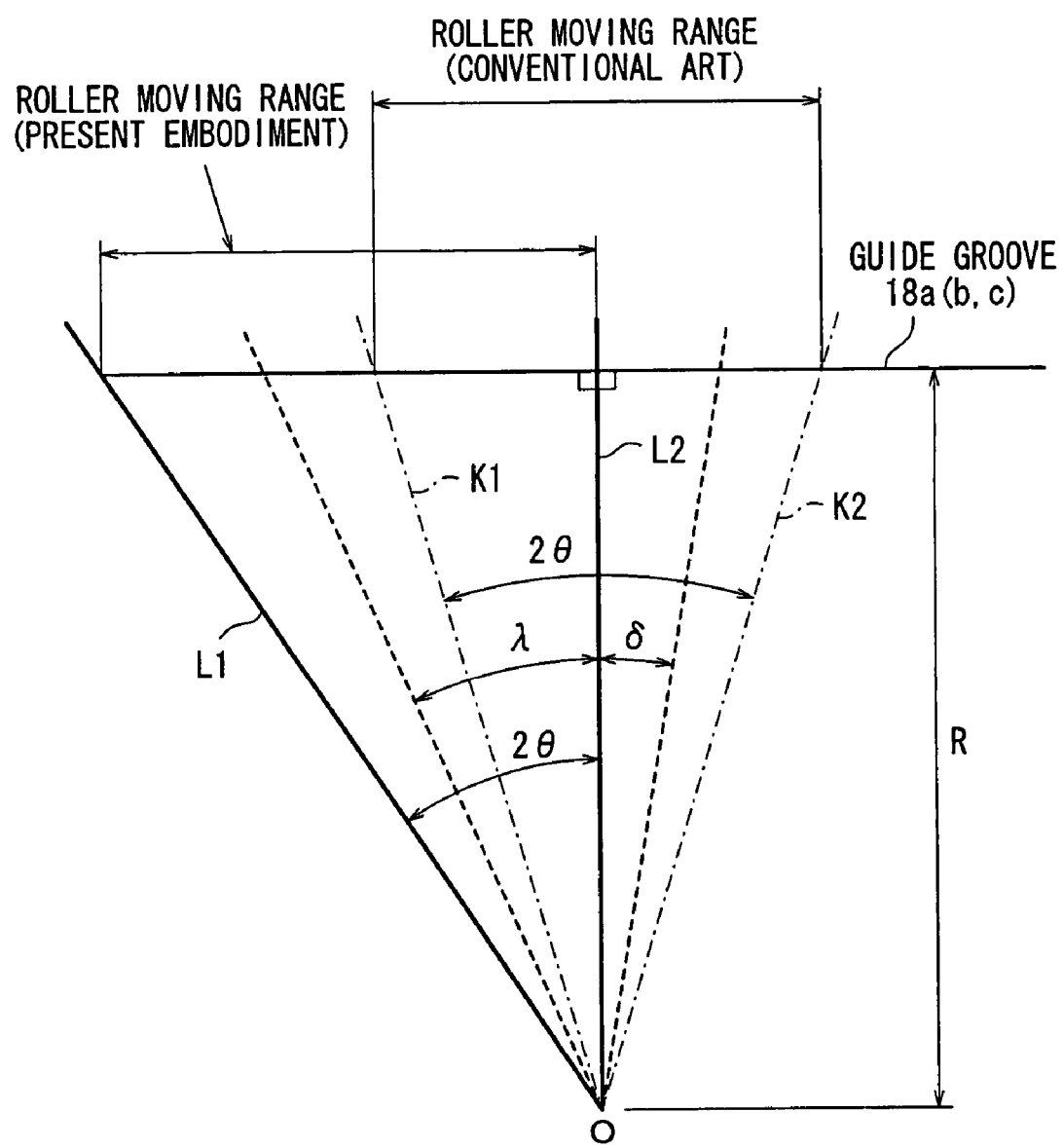
FIG. 24 is a diagram illustrating, for comparison, the moving ranges of rollers of the tripod constant velocity universal joint according to the present embodiment and a conventional tripod constant velocity universal joint.

FIG. 24 shows, for purposes of comparison, movement ranges of the rollers 30 of the tripod constant velocity universal joint 10, according to the present embodiment as well as a conventional tripod constant velocity universal joint. In FIG. 24, R represents the distance from the center O of the spider 24 (axis of the second shaft 14) to the outside diameter of the roller 30, which moves along the guide groove 18c (b, c).

In the conventional tripod constant velocity universal joint, when the operating angle formed between the first shaft and the second shaft is 2θ, the moving range (the amount of movement) of the roller 30 is expressed as 2R tan θ (with reference to two right triangles, whose respective hypotenuses are indicated by the dot-and-dash line K1 and the dot-and-dash line K2).

With the tripod constant velocity universal joint 10 according to the present embodiment, when the operating angle formed between the first shaft and the second shaft 14 is 2θ, the moving range (amount of movement) of the roller 30 is expressed as R tan 2θ (with reference to a right triangle formed by solid lines L1 and L2). When R tan 2θ is modified and expressed as a general formula, the result is R tan δ+R tan λ (provided that δ+λ=2θ).

Because the axes of the first through third trunnions 26a through 26c of the constant velocity universal joint 10 according to the present embodiment are positioned on the same plane, and are inclined at a certain angle, even if the operating angle between the first shaft and the second shaft 14 is 2θ in the same manner as the conventional tripod constant velocity universal joint, the moving range of the roller 30 with respect to the guide groove 18a (b, c) increases, thereby increasing the amount of movement of the roller 30.

In the conventional tripod constant velocity universal joint, for transmitting rotational torque between the first shaft and the second shaft, when the operating angle is 0 degrees (i.e., the first and second shafts are coaxial with each other), the rollers do not move along the guide grooves, and hence the amount of movement of the rollers is nil. When the operating angle increases slightly from 0 degrees to a value that is close to 0 degrees, the moving range (sliding region) of the rollers is still limited, and is restricted to a small area within the guide grooves. Therefore, due to friction and the like, durability of the conventional tripod constant velocity universal joint tends to be reduced.

However, the durability of the constant velocity universal joint 10 according to the present embodiment is increased compared with the conventional tripod constant velocity universal joint, because the amount of movement of the roller 30 with respect to the guide groove 18a (b, c) tends to increase significantly, especially when the operating angle between the first shaft and the second shaft is a value that is close to 0 degrees.

The invention claimed is:

1. A tripod constant velocity universal joint having a tubular outer member coupled to a transmission shaft and having a plurality of guide grooves defined in an inner circumferential surface thereof spaced at predetermined intervals from each other and extending in an axial direction, and an inner member inserted in an open inner space of said outer member and coupled to another transmission shaft, comprising:

a spider having a hole defined centrally therein for mounting said other transmission shaft, and having first through third trunnions projecting toward said guide grooves;

ring-shaped rollers held in contact with said guide grooves and fitted respectively over said first through third trunnions; and a plurality of rolling members rollingly interposed between said first through third trunnions and said rollers, wherein said first through third trunnions have respective axes, which are inclined with respect to a plane perpendicular to the axis of said other transmission shaft, wherein a tilt angle of at least one of said trunnions is different from tilt angles of the other two trunnions, the three axes of said first through third trunnions being positioned in the same plane, and wherein the hole defined in said spider has an axis that extends non-perpendicularly across the plane containing the three axes of said first through third trunnions.

2. A constant velocity universal joint according to claim 1, wherein the tilt angle of said first trunnion is different from the tilt angle of said second trunnion and the tilt angle of said third trunnion, and wherein the tilt angle of said second trunnion and the tilt angle of said third trunnion are equal to each other.

3. A constant velocity universal joint according to claim 1, wherein the tilt angles of said first through third trunnions are different from each other.

* * * * *